(12) United States Patent
Peacemaker et al.

(10) Patent No.: US 11,390,502 B2
(45) Date of Patent: Jul. 19, 2022

(54) TWO SPEED TRAILER JACK

(71) Applicant: SOS Solutions, Inc., Tonasket, WA (US)

(72) Inventors: Samuel R. Peacemaker, Gilbert, AZ (US); Benjamin Peacemaker, Chandler, AZ (US)

(73) Assignee: SOS Solutions, Inc., Tonasket, WA (US)

( * ) Notice: Subject to any disclaimer, the term of this patent is extended or adjusted under 35 U.S.C. 154(b) by 42 days.

(21) Appl. No.: 16/883,811

(22) Filed: May 26, 2020

(65) Prior Publication Data
US 2021/0371258 A1 Dec. 2, 2021

(51) Int. Cl.
*B66F 3/20* (2006.01)
*B66F 3/10* (2006.01)
*B60S 9/08* (2006.01)
*B60D 1/66* (2006.01)

(52) U.S. Cl.
CPC ...... *B66F 3/20* (2013.01); *B60S 9/08* (2013.01); *B66F 3/10* (2013.01); *B60D 1/66* (2013.01)

(58) Field of Classification Search
CPC ..... B66F 3/20; B66F 3/10; B60S 9/08; B60D 1/66
USPC ...................................... 74/89.35
See application file for complete search history.

(56) References Cited

U.S. PATENT DOCUMENTS

| 5,035,094 A | * | 7/1991 | Legare | F16H 25/2056 52/118 |
| 5,676,018 A | | 10/1997 | VanDenberg | |
| 6,685,169 B2 | * | 2/2004 | Shim | B66F 3/10 254/103 |
| 2011/0198478 A1 | * | 8/2011 | Chang | F16M 7/00 248/670 |

FOREIGN PATENT DOCUMENTS

| AU | 4087568 | 1/1970 |
| DE | 102016123356 | 6/2018 |
| EP | 0513973 | 11/1992 |

OTHER PUBLICATIONS

International Searching Authority, International Search Report and Written Opinion dated Jul. 22, 2021 in Application No. PCT/US2021/028212.

* cited by examiner

*Primary Examiner* — Seahee Hong
(74) *Attorney, Agent, or Firm* — Snell & Wilmer LLP

(57) ABSTRACT

A linear jack includes an outer tube, a high speed assembly comprising a first rotating member threadedly coupled to a first translating member, a low speed assembly comprising a second rotating member threadedly coupled to a second translating member, wherein the low speed assembly is coupled to and translates with the first translating member. At least a portion of the high speed assembly is slidable in the outer tube between a first position, wherein the high speed assembly is engaged with a shaft, and a second position, wherein the high speed assembly is disengaged from the shaft. A thread pitch of the high speed assembly is greater than a thread pitch of the low speed assembly.

10 Claims, 25 Drawing Sheets

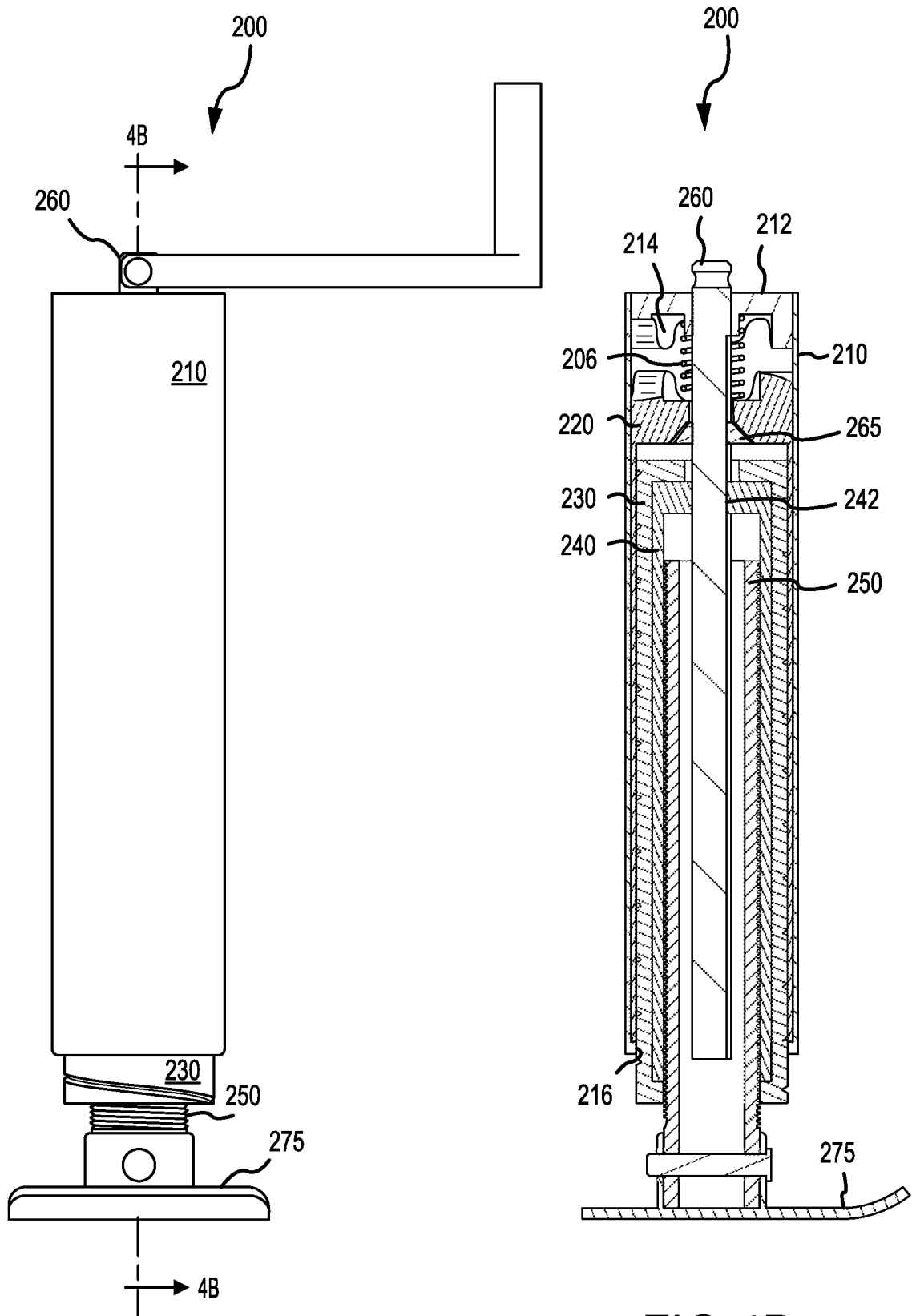

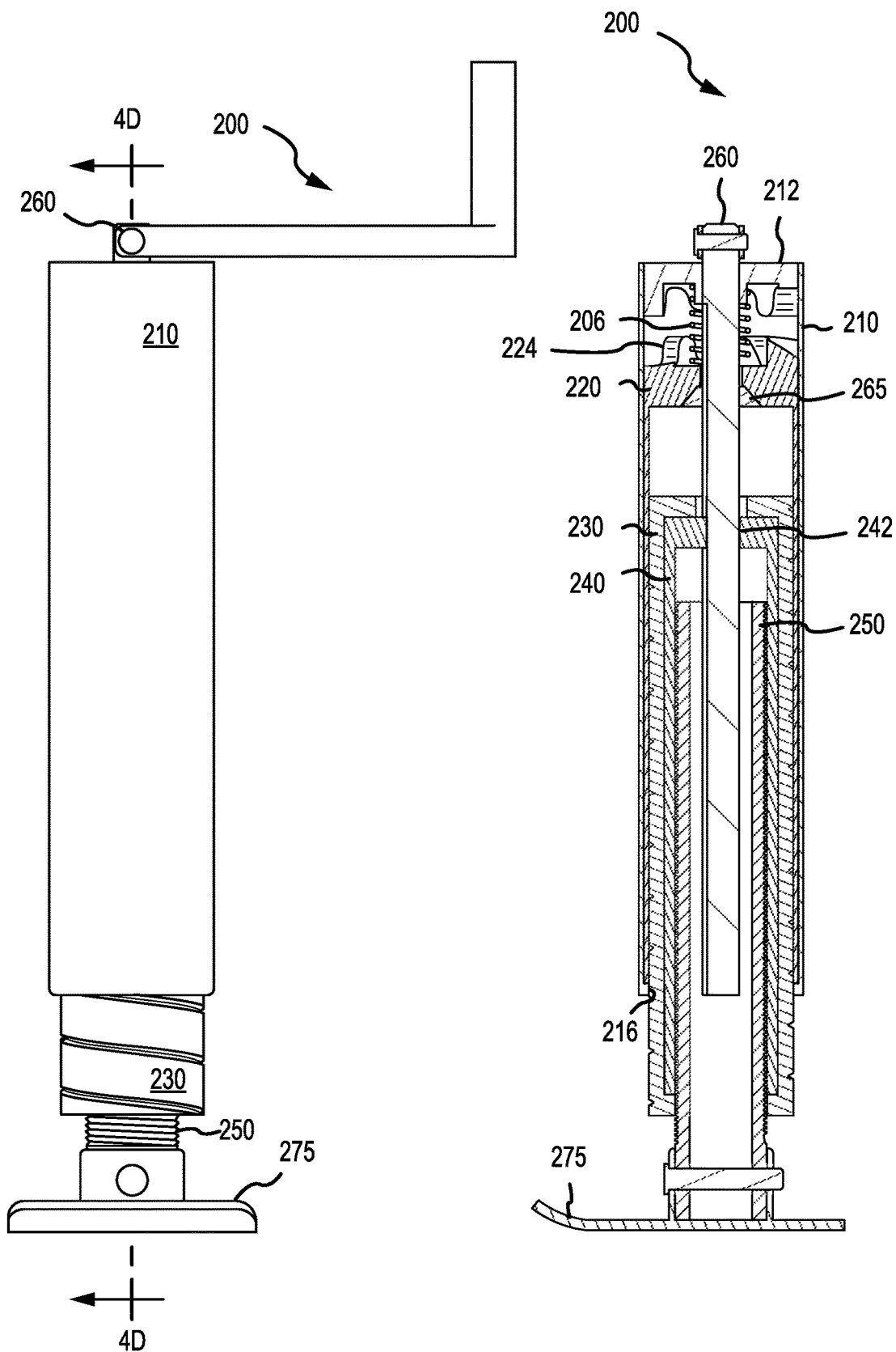

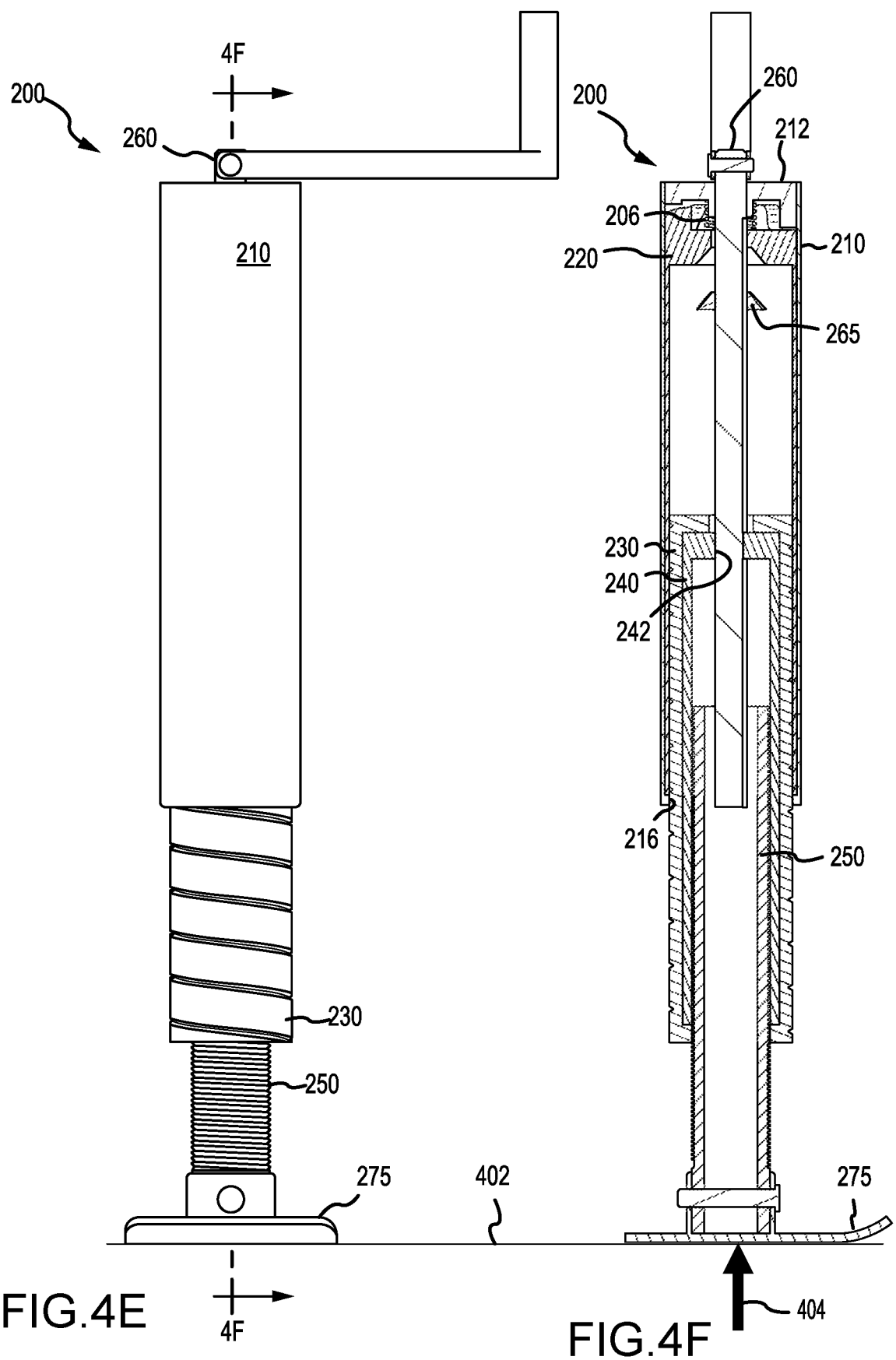

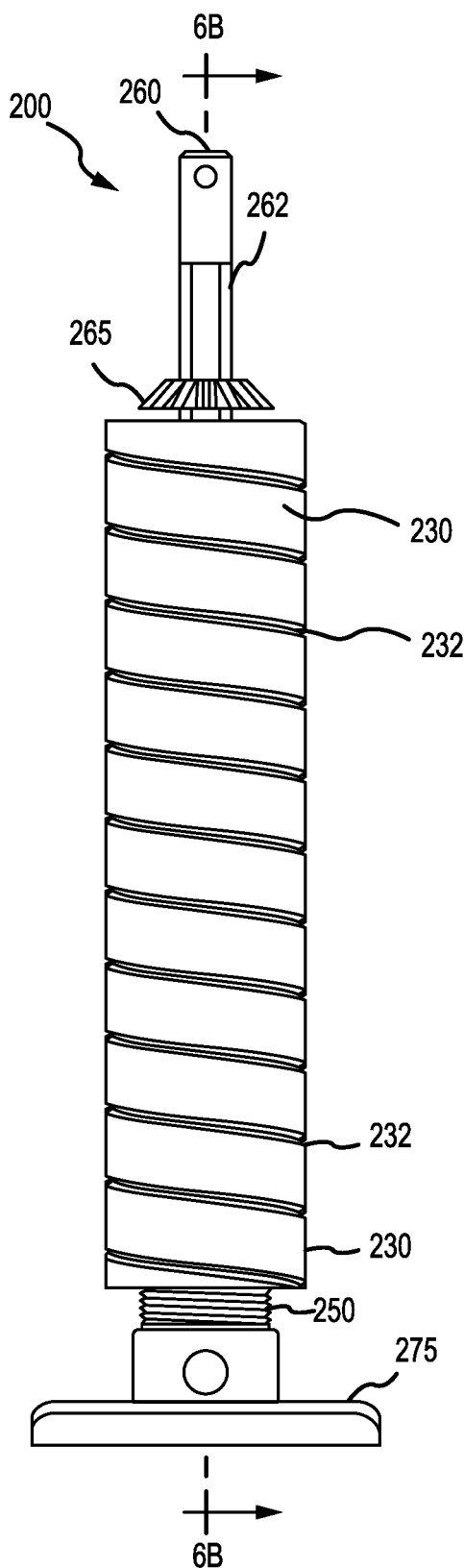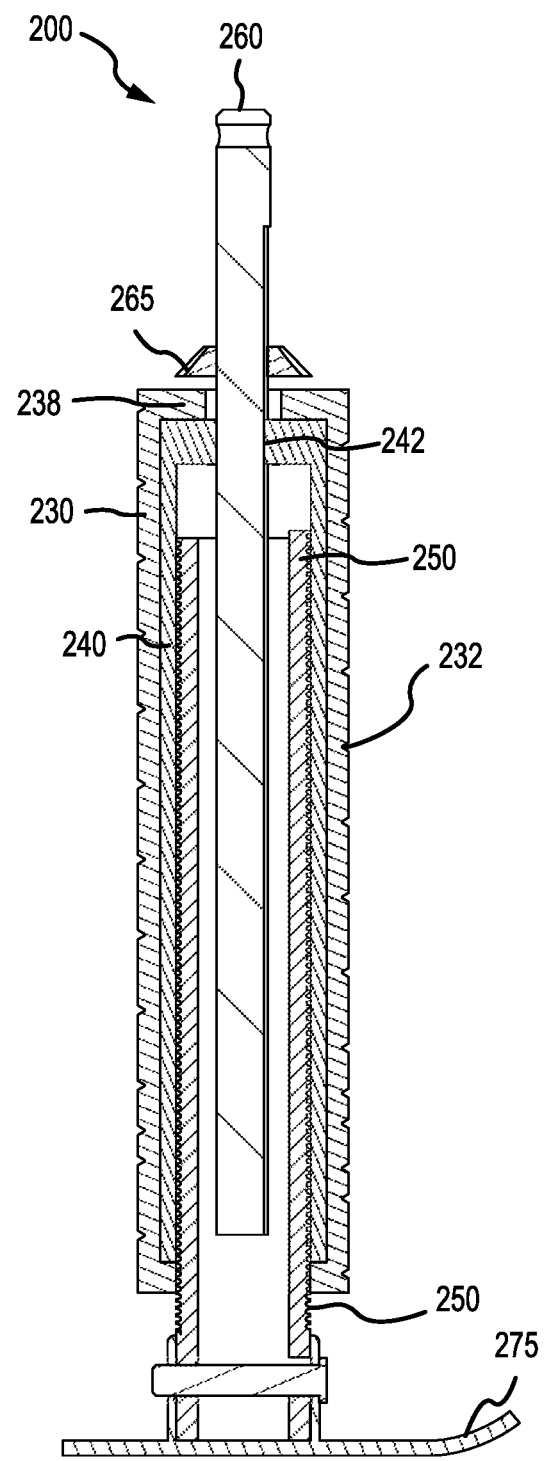
FIG.6A
FIG.6B

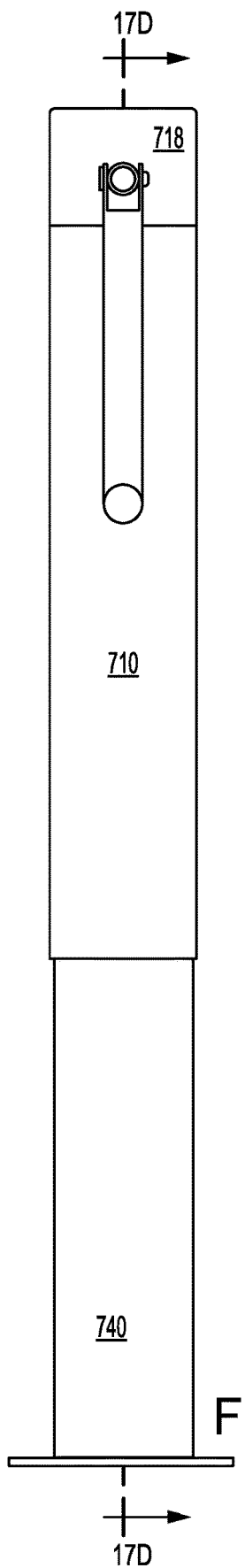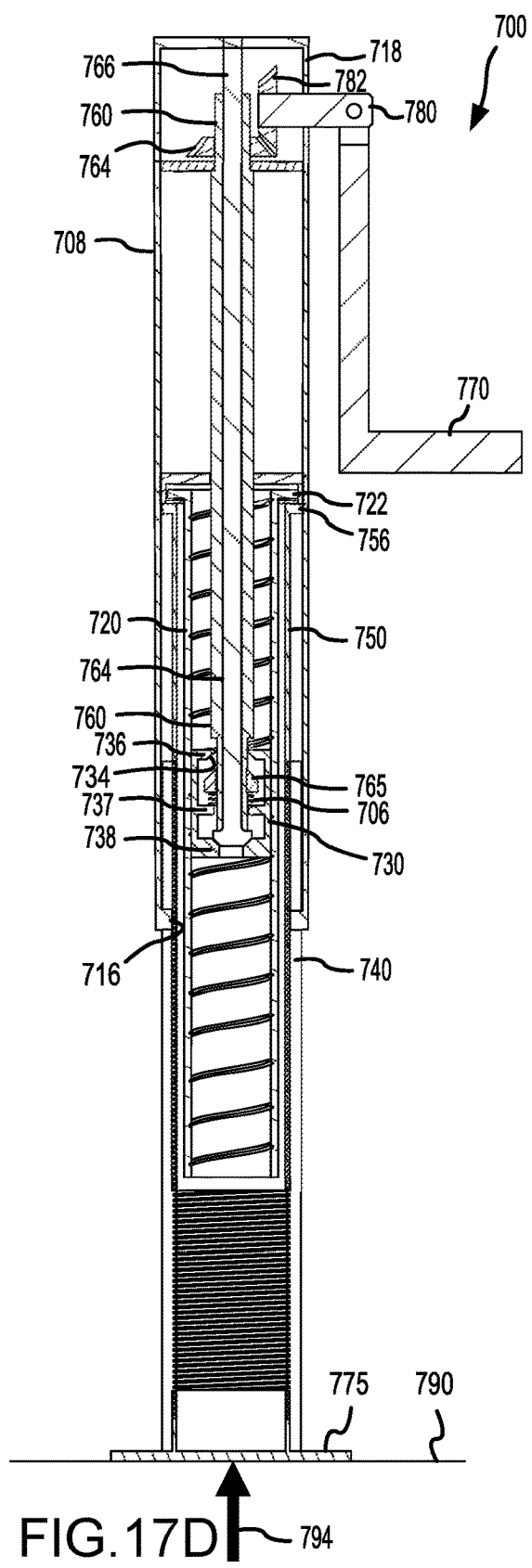
FIG.17C
FIG.17D

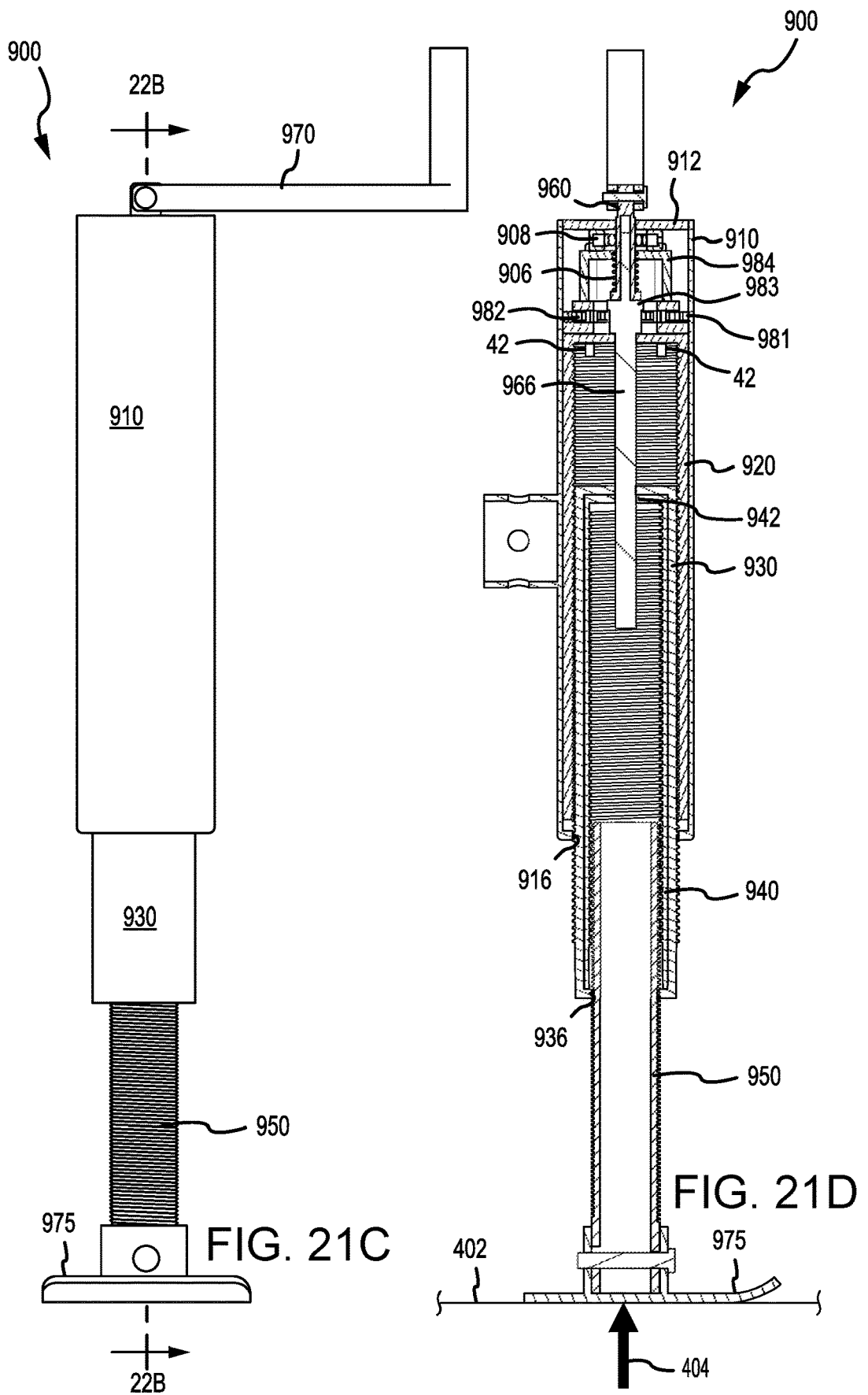

TWO SPEED TRAILER JACK

FIELD

The present disclosure relates generally to apparatuses such as jacks for lifting and suspending vehicles, trailers, and other large objects, and, more specifically, to linear jacks that are used to selectively lower and raise, for example, a portion of a trailer.

BACKGROUND

Many of the different types of trailers that are towed by trucks are connected to the trucks by a releasable coupling such as a gooseneck coupling, a fifth wheel coupling, a bumper pull coupling and the like. After the trailer is released from the truck and is no longer supported by the truck at the forward end of the trailer, a lifting device, such as a jack and/or landing gear assembly, is often used to support the trailer floor or bed, typically in a position generally horizontal to the ground.

A typical lifting device is attached to the trailer adjacent the truck coupling at the forward end of the trailer. The lifting device includes one or more vertically oriented columns and a vertical leg is mounted on the column. A hand crank is typically connected to the gear mechanism. Selectively rotating the hand crank lowers the leg until the leg contacts the ground and supports the forward end of the trailer when the trailer is being uncoupled from the truck, or raises the leg when the trailer has been connected to a truck and is ready for towing.

SUMMARY

A linear jack is disclosed, comprising a first outer sleeve, an inner sleeve disposed at least partially within the first outer sleeve, a second outer sleeve disposed at least partially within the inner sleeve, and a translating screw disposed at least partially within the second outer sleeve, wherein the first outer sleeve is threadedly coupled to the inner sleeve, the second outer sleeve is threadedly coupled to the translating screw, and a thread pitch of the inner sleeve is greater than a thread pitch of the translating screw.

In various embodiments, the inner sleeve is configured to translate with respect to the first outer sleeve in response to rotation of the first outer sleeve, and the translating screw is configured to translate with respect to the second outer sleeve in response to rotation of the second outer sleeve.

In various embodiments, the linear jack further comprises an outer tube comprising a centerline axis, wherein the first outer sleeve is disposed at least partially within the outer tube, a shaft coupled to the second outer sleeve, a gear coupled to the shaft, and a spring operatively coupled to the high speed outer shaft, wherein the first outer sleeve is slidable in the outer tube between a first position and a second position. In the first position, the spring biases the first outer sleeve to engage the gear whereby turning the shaft a first rotational direction extends the inner sleeve from the first outer sleeve, and turning the shaft a second rotational direction retracts the inner sleeve into the first outer sleeve. In the second position, the first outer sleeve is moved against a bias of the spring and disengaged from the gear whereby turning the shaft the first rotational direction extends the translating screw from the second outer sleeve, and turning the shaft the second rotational direction retracts the translating screw into the second outer sleeve.

In various embodiments, turning the shaft the first rotational direction extends the translating screw from the second outer sleeve, and turning the shaft the second rotational direction retracts the translating screw into the second outer sleeve, regardless of the first outer sleeve being in the first position or the second position.

In various embodiments, the gear is disposed within the first outer sleeve.

In various embodiments, the spring is disposed within the outer tube.

In various embodiments, the second outer sleeve rotates with the shaft.

In various embodiments, the first outer sleeve, the inner sleeve, the second outer sleeve, and the translating screw are in coaxial alignment.

In various embodiments, the linear jack further comprises a second gear coupled to the shaft, wherein the second gear is disposed externally from the first outer sleeve, a crank oriented substantially perpendicular to the shaft, and a third gear coupled to the crank, wherein the second gear is in meshing relation with the third gear, whereby rotating of the crank causes the shaft to rotate.

In various embodiments, the linear jack further comprises a foot coupled to an end of the translating screw.

A linear jack is disclosed, comprising a first outer sleeve disposed at least partially around an inner sleeve, wherein the first outer sleeve is threadedly coupled to the inner sleeve, wherein the first outer sleeve is linearly translatable between a first position wherein the first outer sleeve is drivably coupled with a shaft and a second position wherein the first outer sleeve is disengaged from the shaft.

In various embodiments, the linear jack further comprises the shaft coaxially aligned with the first outer sleeve and the inner sleeve.

In various embodiments, the linear jack further comprises an outer tube having a centerline axis, the outer tube coaxial to the first outer sleeve and the inner sleeve, wherein the first outer sleeve translates along the centerline axis with respect to the outer tube between the first position and the second position.

In various embodiments, the linear jack further comprises a spring operatively coupled to the first outer sleeve.

In various embodiments, the spring is configured to bias the first outer sleeve towards the first position.

In various embodiments, the first outer sleeve is configured to move to the second position against a bias of the spring.

In various embodiments, the first outer sleeve comprises a flange disposed at an upper end thereof, and the shaft is configured to extend through the flange.

In various embodiments, the linear jack further comprises a gear configured to rotate with the shaft, and a plurality of teeth disposed on the flange of the first outer sleeve, wherein the plurality of teeth are configured to be in meshing relation with the gear in response to the first outer sleeve moving to the first position.

A method of manufacturing a linear jack is disclosed, comprising disposing an inner sleeve at least partially within a first outer sleeve, wherein the first outer sleeve is threadedly coupled to the inner sleeve, disposing a translating screw at least partially within a second outer sleeve, wherein the second outer sleeve is threadedly coupled to the translating screw, and disposing the second outer sleeve at least partially within the inner sleeve, wherein a thread pitch of the inner sleeve is greater than a thread pitch of the translating screw.

In various embodiments, the method further comprises disposing a spring within an outer tube, disposing the first outer sleeve at least partially within the outer tube and in contact with the spring; and disposing a shaft to extend through at least the outer tube, the first outer sleeve, the inner sleeve, and the second outer sleeve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be example in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 4A and FIG. 4B illustrate a side view and a section view, respectively, of the lifting device of FIG. 2, with the lifting device in a retracted state, and a high speed outer sleeve in a first position, in accordance with various embodiments.

FIG. 4C and FIG. 4D illustrate a side view and a section view, respectively, of the lifting device of FIG. 4A and FIG. 4B, with the lifting device in a partially extended state, and the high speed outer sleeve in the first position, in accordance with various embodiments.

FIG. 4E and FIG. 4F illustrate a side view and a section view, respectively, of the lifting device of FIG. 4A and FIG. 4B, with the lifting device in an extended state, and the high speed outer sleeve in a second position, in accordance with various embodiments.

FIG. 6A and FIG. 6B illustrate a side view and a section view, respectively, of the lifting device of FIG. 4A and FIG. 4B, with the outer tube and the high speed outer sleeve of the lifting device omitted for clarity purposes, in accordance with various embodiments.

FIG. 17C and FIG. 17D illustrate a side view and a section view, respectively, of the lifting device of FIG. 17A and FIG. 17B, with the lifting device in an extended state, and the high speed rotating screw in a second position, in accordance with various embodiments.

FIG. 21C and FIG. 21D illustrate a side view and a section view, respectively, of the lifting device of FIG. 21A and FIG. 21B, with the lifting device in an extended state, and the outer sleeve in a second position and a sun gear in a second position, in accordance with various embodiments.

DETAILED DESCRIPTION

Figure 1:
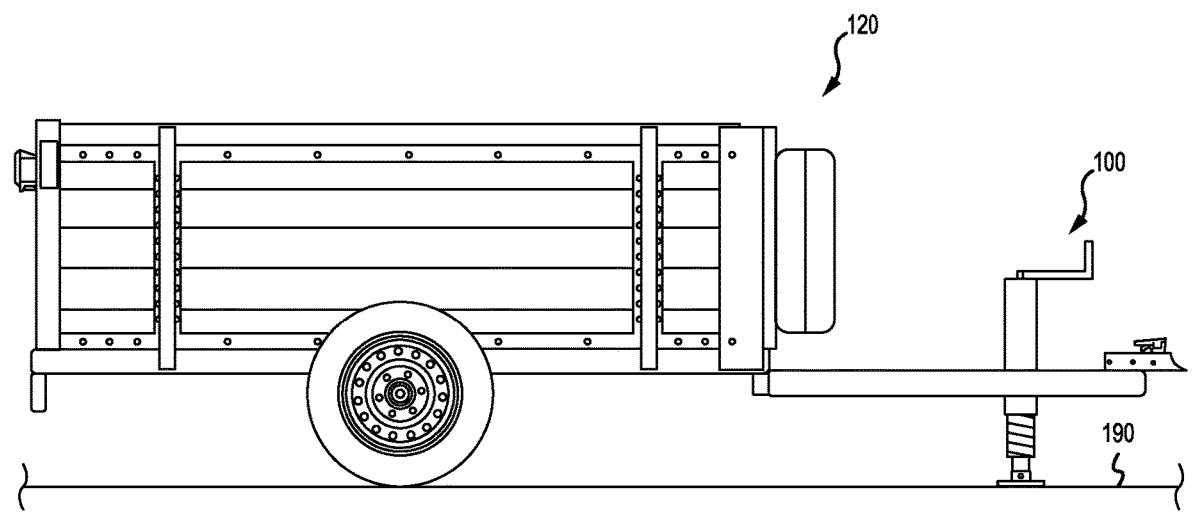
FIG. 1 illustrates a schematic view of a trailer-mounted lifting device supporting a front end of a trailer on a ground surface, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Typical lifting devices, such as linear trailer jacks, operate using a constant thread pitch sized to obtain sufficient mechanical advantage to lift a heavy load, such as a trailer. In that regard, as a smaller thread pitch increases mechanical advantage relative to a larger thread pitch, many available linear trailer jacks use a constant, small thread pitch. However, the gain in mechanical advantage is offset by the increase in the number of rotations of an input device (e.g., a handle) needed to extend (translate) the linear trailer j ack. In this manner, conventional linear trailer jack may provide the mechanical advantage desired to lift a trailer but at the expense of time consuming, and bothersome, turning.

Thread pitch, as used herein, is generally defined as the distance between threads on a threaded coupling, such as that found on a screw, lead screw or jack screw. Thread count, expressed for example as threads per inch, is generally defined as the number of threads per inch of linear distance on a threaded coupling, such as that found on a screw, lead screw or jack screw. In that regard, thread pitch and thread count are related, both expressing the spacing of threads about a screw, lead screw or jack screw.

Systems and methods for a two speed lifting device—such as a linear trailer jack—are provided herein. A lifting device of the present disclosure generally comprises a high speed assembly and a low speed assembly. The high speed assembly generally comprises a screw mechanism comprising a nut threadedly coupled to a screw. In various embodiments, the nut rotates and the screw translates, and in various embodiments, the nut translates and the screw rotates. The screw and nut are threadedly coupled for translating the rotational force to a linear force. The low speed assembly also comprises a nut threadedly coupled to a screw. A thread pitch of the high speed assembly is greater than a thread pitch of the low speed assembly, in various embodiments. In this manner, when driven by a common shaft and/or at the same revolutions per unit time, the high speed assembly causes the lifting device to extend a greater linear distance per rotation of a shaft than the low speed assembly.

In this manner, the high speed assembly causes more linear extension per rotation and thus reduces the number of rotations needed to lower or raise the lifting device. This reduces or eliminates the wasted time incurred if no such high speed assembly existed. However, when the lifting device begins to touch the ground, and mechanical advantage now becomes more important, in various embodiments, the high speed assembly is disengaged, for example, automatically disengaged. Thus, in response to the lifting device contacting a ground surface, a force is reacted into the high speed assembly, thereby moving a moveable member of the high speed assembly from a first position to a second position, and disengaging the high speed assembly from being drivably coupled with the shaft and/or other motive rotational force. With the moveable member of the high speed assembly in the second position, only the low speed assembly is driven in response to rotation of the shaft, thereby benefiting from the mechanical advantage of the low speed assembly, which has a smaller thread pitch than the high speed assembly. In this manner, lifting devices of the present disclosure may quickly and efficiently extend in overall length, reducing the number of turns required to reach a ground surface, while still providing the mechanical advantage to lift heavy loads. In various embodiments, this transition occurs without any additional action and thus improves ease of use and reduces overall time needed for operation. In this manner, lifting devices of the present disclosure may automatically switch from a high speed mode to a low speed mode in response to the ground force being reacted through the lifting device (i.e., in response to contacting the ground as the jack is extended).

With reference to FIG. 1, a trailer 120 partially supported on a ground surface 190 by a lifting device 100 is illustrated, in accordance with various embodiments. Lifting device 100 may be coupled to a front end of the trailer 120. Lifting device 100 may be generally vertically oriented when supporting the front end of the trailer 120. Although illustrated coupled to a utility type trailer, lifting devices of the present disclosure may be utilized on any trailer or vehicle where support is desired, for example, with a camper, recreational vehicle, toy hauler, boat, or any other device capable of being towed as a trailer.

Figure 2:
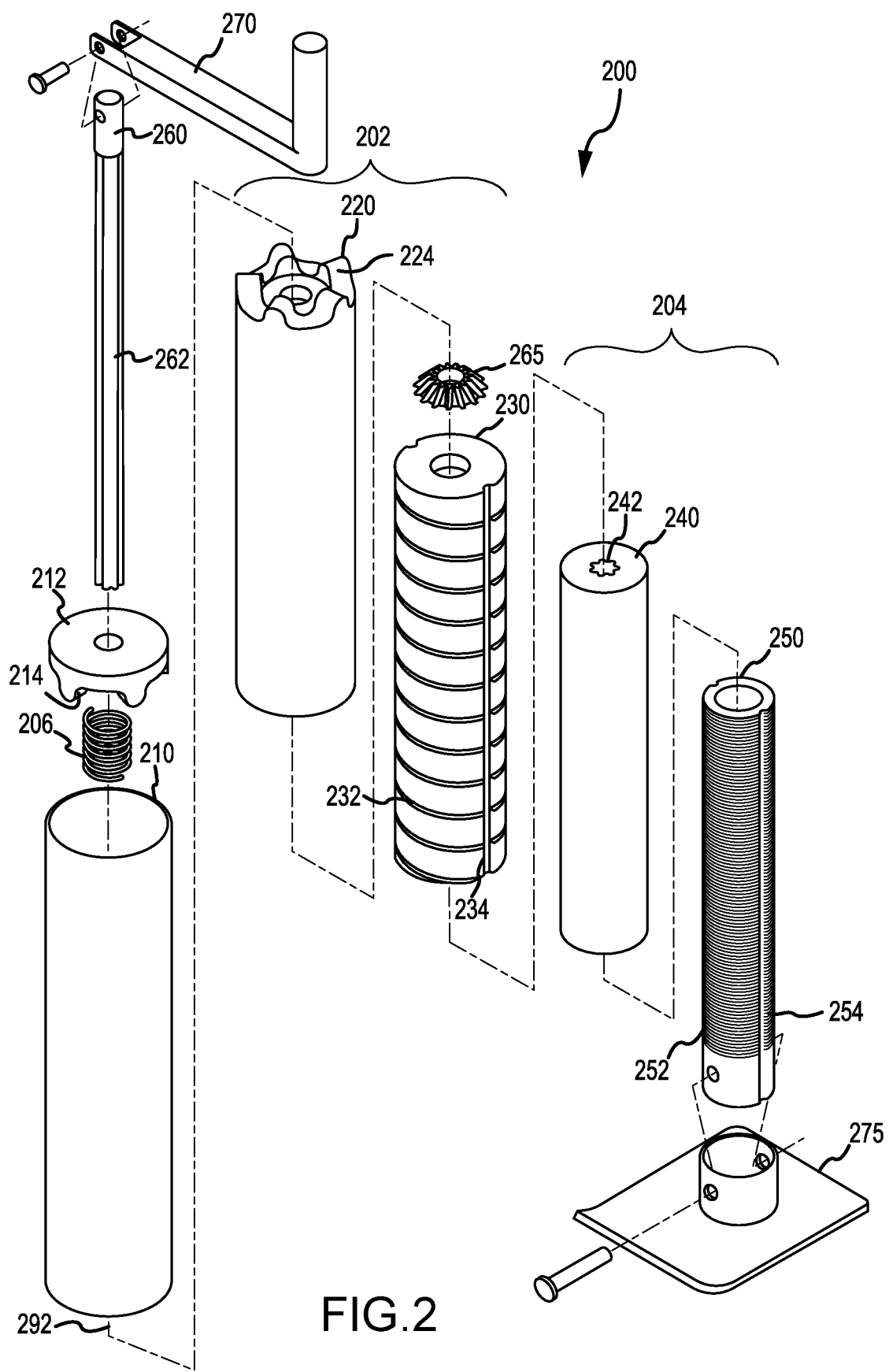
FIG. 2 illustrates an exploded view of a lifting device, in accordance with various embodiments.

With reference to FIG. 2, an exploded view of a lifting device 200 is illustrated, in accordance with various embodiments. Lifting device 200 may be a linear jack. Lifting device 200 may generally comprise an outer tube 210, a high speed assembly 202, and a low speed assembly 204. High speed assembly 202 may generally comprise a screw mechanism comprising a rotating nut threadedly coupled to a translating screw, in the manner of a leadscrew or jack screw. In various embodiments, high speed assembly 202 comprises a rotating outer sleeve 220 (also referred to herein as a high speed outer sleeve or a first outer sleeve), and a translating inner sleeve 230 (also referred to herein as a high speed inner sleeve). Low speed assembly 204 may generally comprise a screw mechanism comprising a rotating nut threadedly coupled to a translating screw. Low speed assembly 204 may comprise a rotating outer sleeve 240 (also referred to herein as a low speed outer sleeve or a second outer sleeve), and a translating screw 250 (also referred to herein as a low speed inner sleeve).

Figures 15A, 15B:
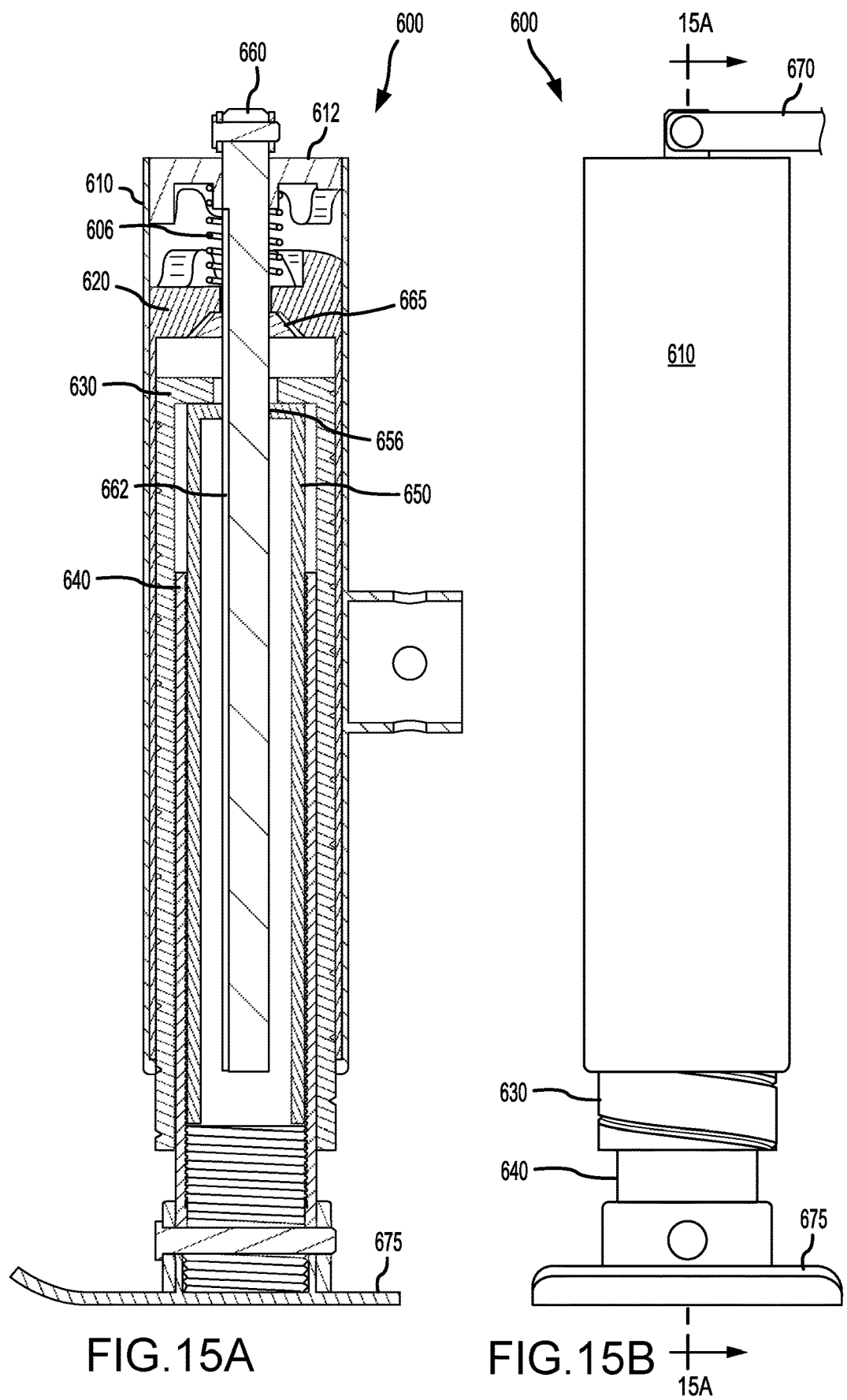
FIG. 15A and FIG. 15B illustrate a section view and a side view, respectively, of a lifting device comprising a low speed assembly comprising a rotating screw and a translating nut, in accordance with various embodiments.
Figure 16:
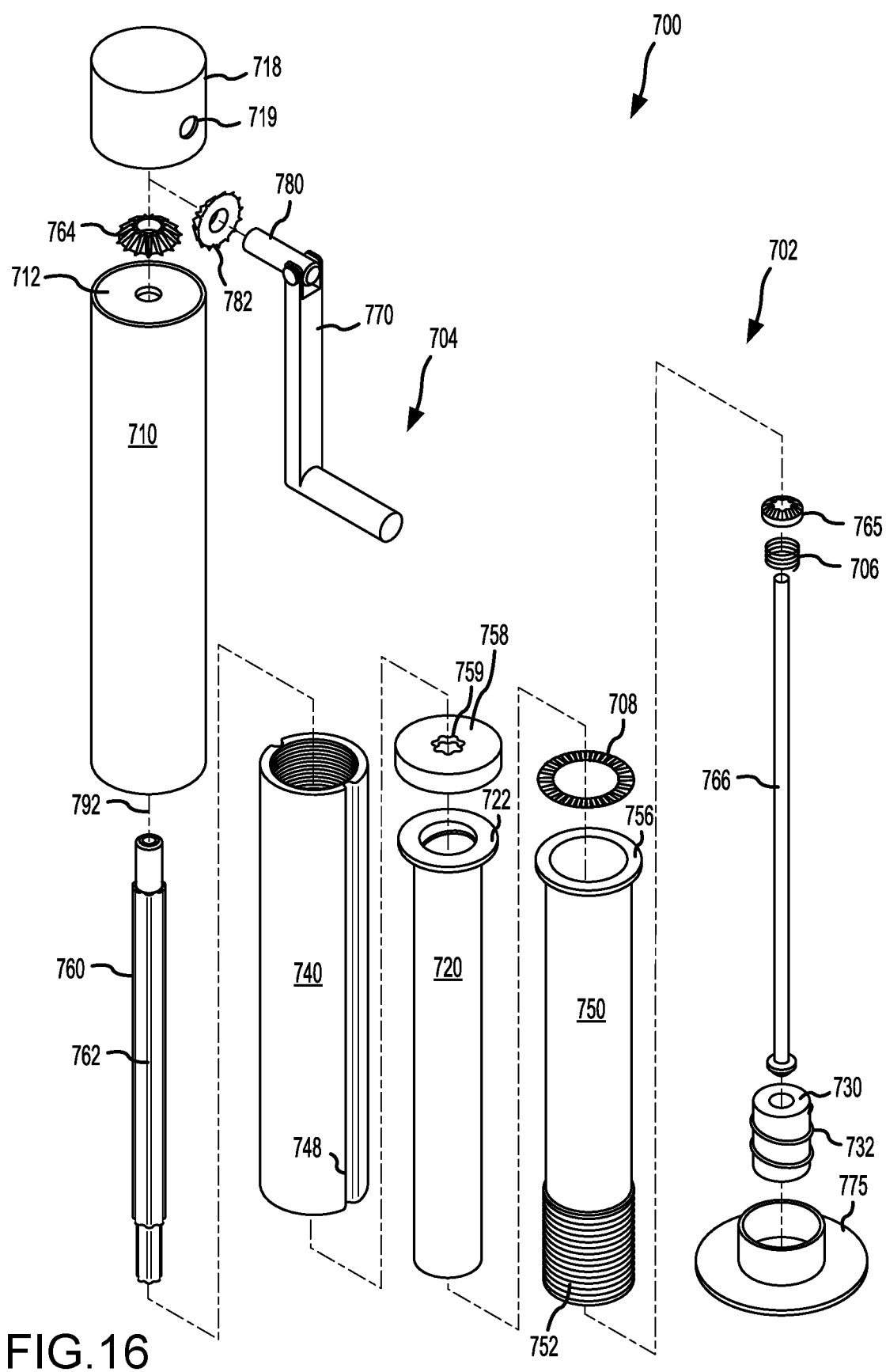
FIG. 16 illustrates an exploded view of a lifting device comprising a high speed assembly nested within a low speed assembly, in accordance with various embodiments.

Although the present disclosure is described in accordance with various embodiments on the basis of a screw mechanism having a rotating nut and a translating screw, it should be understood that the present disclosure can be applied with a rotating screw and a translating nut, as illustrated in FIG. 15A and/or FIG. 16, for example.

Outer tube 210 may comprise a centerline axis 292. Outer tube 210 may be hollow. Outer sleeve 220 may be disposed at least partially within outer tube 210. Outer sleeve 220 may be hollow. Inner sleeve 230 may be disposed at least partially within outer sleeve 220. Inner sleeve 230 may be hollow. Outer sleeve 240 may be disposed at least partially within inner sleeve 230. Outer sleeve 240 may be hollow. Translating screw 250 may be disposed at least partially within outer sleeve 240. Translating screw 250 may be hollow. Lifting device 200 may further comprise a shaft 260. Shaft 260 may be disposed at least partially within translating screw 250. In this regard, the inner diameter of outer tube 210 may be greater than the outer diameter of outer sleeve 220. The inner diameter of outer sleeve 220 may be greater than the outer diameter of inner sleeve 230. The inner diameter of inner sleeve 230 may be greater than the outer diameter of outer sleeve 240. The inner diameter of outer sleeve 240 may be greater than the outer diameter of translating screw 250. The inner diameter of translating screw 250 may be greater than the outer diameter, or width, of shaft 260. Outer tube 210, outer sleeve 220, inner sleeve 230, outer sleeve 240, translating screw 250, and shaft 260 are coaxially aligned and/or substantially coaxially aligned, but in various embodiments coaxial alignment is not present. One end of shaft 260 may bear a handle 270 which may be used for rotating the shaft 260.

Lifting device 200 may further comprise a gear 265. Gear 265 may be coupled to, and rotate with, shaft 260. Gear 265 may be coaxially aligned with shaft 260. Shaft 260 may drive outer sleeve 220 via gear 265 in response to outer sleeve 220 moving to a first position, as described in further detail herein. Gear 265 may be splined to the shaft 260 but gear 265 may also be fixedly coupled such as through welding, brazing, a press fit and/or an interference fit. Gear 265 may comprise any suitable gear, for example, a bevel gear or a crown gear.

Lifting device 200 may further comprise a spring 206. Spring 206 may be a coil spring, leaf spring, Belleville spring, or other suitable spring for exerting a bias against outer sleeve 220. Spring 206 may be operatively coupled to outer sleeve 220, to assist movement of outer sleeve 220 between the first position and a second position, as described herein with further detail. In this regard, outer sleeve 220 may be slidable in the outer tube 210 between the first position and the second position. Outer sleeve 220 may translate along centerline axis 292 between the first position and the second position. The outer tube 210 may comprise a retaining member 212. Retaining member 212 may be coupled to outer tube 210, e.g., via a threaded connection, fasteners, and/or a metal joining process, such as welding, brazing, etc. Retaining member 212 may comprise a cap structure coupled to the upper end of outer tube 210. Retaining member 212 may comprise a flange extending radially inward from an inner diameter surface of outer tube 210. Shaft 260 may extend through retaining member 212. Retaining member 212 may retain spring 206 within outer tube 210. In this regard, spring 206 may be compressed between retaining member 212 and outer sleeve 220. In various embodiments, retaining member 212 comprises a mating surface 214 configured to engage with a mating surface 224 of outer sleeve 220 in response to outer sleeve 220 moving to the second position (see FIG. 4F). In this manner, outer sleeve 220 may be restricted from rotating within outer tube 210 in the second position. In various embodiments, and as shown, mating surface 224 and mating surface 214 are crenulated and, as shown, having crenulations that are complementary to one another. The crenulations interact, in response to axial compression, to transfer torque to outer sleeve 220.

In various embodiments, outer sleeve 220 is threadedly coupled to inner sleeve 230. Thus, rotation of the outer sleeve 220 causes the inner sleeve 230 to translate with respect to outer tube 210. Stated differently, high speed assembly 202 translates rotational motion of outer sleeve 220 to linear motion of inner sleeve 230. In various embodiments, outer sleeve 240 is threadedly coupled to translating screw 250. Thus, rotation of the outer sleeve 240 causes the translating screw 250 to translate with respect to outer tube 210. Stated differently, low speed assembly 204 translates rotational motion of outer sleeve 240 to linear motion of translating screw 250.

Various components of lifting device 200 may be made from a metal or metal alloy, such as cast iron, steel, stainless steel, austenitic stainless steels, ferritic stainless steels, martensitic stainless steels, titanium, titanium alloys, aluminum, aluminum alloys, galvanized steel, or any other suitable metal or metal alloy. In this regard, outer tube 210, outer sleeve 220, inner sleeve 230, outer sleeve 240, and translating screw 250 may be made from a metal or metal alloy. It is contemplated that various components of lifting device 200, such as outer tube 210, may be made from a fiber-reinforced composite material.

Figure 3A:
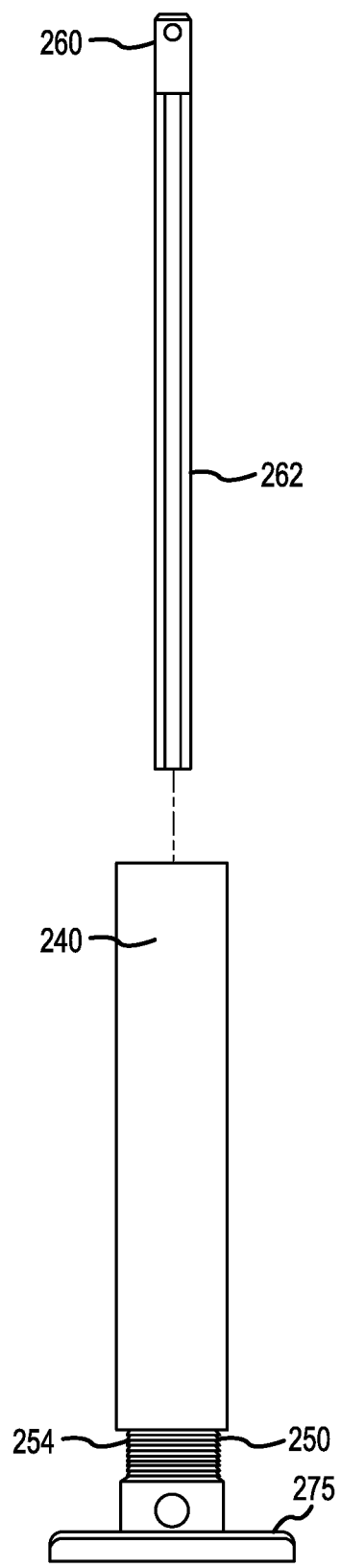
FIG. 3A and FIG. 3B illustrate a partially exploded view of a low speed assembly and a shaft of the lifting device of FIG. 2, the shaft for driving the low speed assembly, in accordance with various embodiments.
Figure 3B:
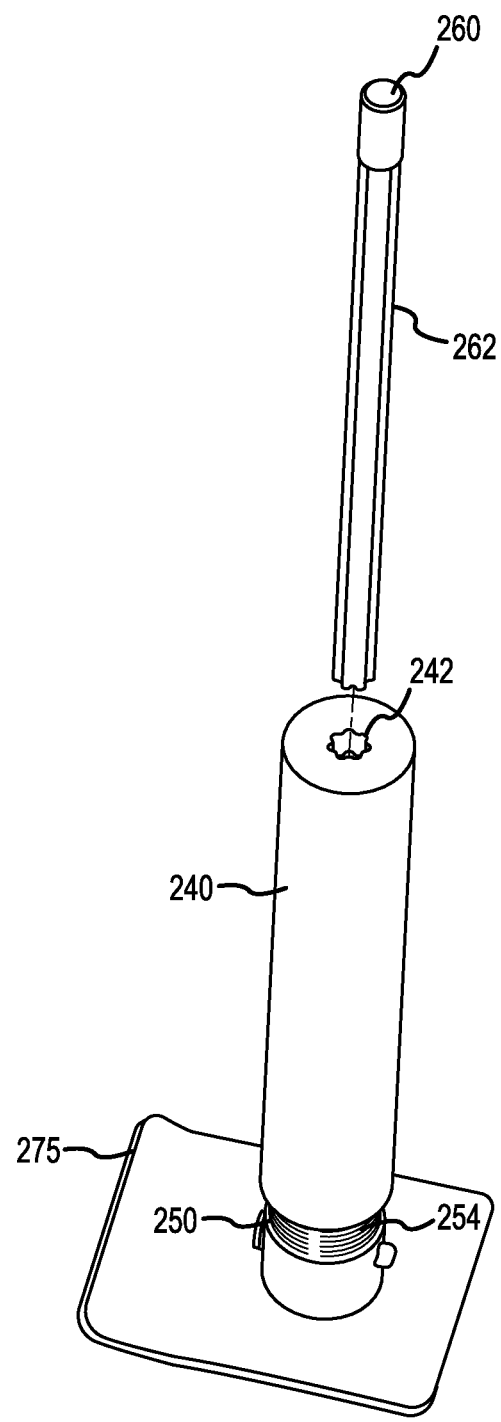

With combined reference to FIG. 2, FIG. 3A, and FIG. 3B, shaft 260 may be operatively coupled to outer sleeve 240 such that outer sleeve 240 rotates with shaft 260. In various embodiments, shaft 260 may comprise one or more splines 262 and outer sleeve 240 may comprise a center aperture 242 comprising a geometry that is complementary to shaft 260. In this regard, center aperture 242 may comprise one or more grooves configured to receive the one or more splines 262 of shaft 260 such that shaft 260 interlocks with outer sleeve 240 to impart rotational forces (i.e., torque) therebetween. Stated differently, outer sleeve 240 and shaft 260 may be coupled via a splined connection. Outer sleeve 240 may be drivably coupled to shaft 260 via center aperture 242. Furthermore, although illustrated as a star shaped aperture, center aperture 242 may comprise various geometries, such as triangular, square, or any other geometry that interlocks shaft 260 with outer sleeve 240. However, shaft 260 may be operatively coupled to outer sleeve 240 using various methods without departing from the scope and spirit of the present disclosure, such as via a fastener, for example.

In operation, rotation of shaft 260 in a first rotational direction, e.g., via handle 270, causes outer sleeve 240 to rotate with respect outer tube 210 and translating screw 250, which in turn causes translating screw 250 to extend from outer sleeve 240 (see FIG. 4E and FIG. 4F). Conversely, rotation of shaft 260 in a second rotational direction (opposite the first rotational direction) causes outer sleeve 240 to rotate with respect outer tube 210 and translating screw 250, which in turn causes translating screw 250 to retract into outer sleeve 240 (see FIG. 4A and FIG. 4B).

Furthermore, with outer sleeve 220 in a first position (see FIG. 4A through FIG. 4D) with respect to outer tube 210, outer sleeve 220 may be drivably coupled to shaft 260. Stated differently, rotation of shaft 260 may drive rotation of outer sleeve 220. In operation, and with outer sleeve 220 in a first position (see FIG. 4A through FIG. 4D) with respect to outer tube 210 and/or gear 265, rotation of shaft 260 in a first rotational direction, e.g., via handle 270, may cause outer sleeve 220 to rotate with respect outer tube 210 and inner sleeve 230, which in turn causes inner sleeve 230 to extend from outer sleeve 220. Conversely, rotation of shaft 260 in a second rotational direction (opposite the first rotational direction) may cause outer sleeve 220 to rotate with respect outer tube 210 and inner sleeve 230, which in turn causes inner sleeve 230 to retract into outer sleeve 220. In the first position, spring 206 may bias outer sleeve 220 to engage with gear 265. Thus, with the outer sleeve 220 in the first position, both the inner sleeve 230 and the translating screw 250 are driven to translate with respect to outer tube 210 in response to rotation of shaft 260.

However, in operation and with outer sleeve 220 in a second position (see FIG. 4E and FIG. 4F) with respect to outer tube 210 and/or gear 265, the outer sleeve 220 is disengaged from gear 265 (i.e., rotation of shaft 260 and gear 265 does not drive rotation of outer sleeve 220 in the disengaged position). In this regard, with outer sleeve 220 in the second position, rotation of shaft 260 in the first rotational direction or the second rotational direction may cause only outer sleeve 240 (and not outer sleeve 220) to rotate with respect to outer tube 210 and translating screw 250, thereby driving only the translating screw 250 to translate. Stated differently, the high speed assembly 202 (i.e., the outer sleeve 220 and inner sleeve 230) may be disengaged from operation in response to the outer sleeve 220 moving to the second position. In this manner, in response to rotation of shaft 260 in the first direction, both the high speed assembly 202 and the low speed assembly 204 (i.e., the outer sleeve 240 and translating screw 250) are driven to increase the overall length of lifting device 200 but, after reacting force from the ground through, for example, foot 275, rotation of shaft 260 is only imparted to low speed assembly 204 and not high speed assembly 202. With momentary reference to FIG. 4E and FIG. 4F, as the overall length of lifting device 200 is increased, the foot 275 of the lifting device 200 may contact a ground surface 402, thereby imparting a force 404 from the ground surface 402 into the outer sleeve 220 which causes the outer sleeve 220 to move with respect to outer tube 210 against the bias of spring 206 from the first position (i.e., engaged with gear 265) to the second position (i.e., disengaged from gear 265) thereby decoupling outer sleeve 220 from torsional forces imparted by shaft 260. In this regard, before the lifting device 200 has contacted a ground surface, the overall length of the lifting device 200 is quickly increased to reduce the overall number of rotations of shaft 260 needed to cause lifting device 200 to reach the ground. In response to contacting the ground, the high speed assembly 202 is decoupled from the shaft 260 to take advantage of the mechanical advantage of the low speed assembly 204. In this manner, time to operate is reduced relative to conventional designed and increased mechanical advantage is selectively activated.

In various embodiments, inner sleeve 230 comprises helically extending grooves or threads 232. In various embodiments, translating screw 250 comprises helically extending grooves and/or threads 252. The thread pitch of threads 232 may be greater than the thread pitch of threads 252. Stated differently, translating screw 250 may comprise more threads per inch (TPI) than inner sleeve 230. In various embodiments, the thread pitch of threads 232 is between 101% and 1000% as large as the thread pitch of threads 252, though various embodiments, the thread pitch of threads 232 is between 200% and 500% as large as the thread pitch of threads 252. In various embodiments, the thread pitch of threads 232 is more than twice as large as the thread pitch of threads 252. In various embodiments, the thread pitch of threads 232 is more than three times as large as the thread pitch of threads 252. In various embodiments, the thread pitch of threads 232 is more than four times as large as the thread pitch of threads 252. It should be understood that the maximum thread pitch may be limited by the moment arm for torque applied to the shaft 260 and may be limited to reduce the torque requirement for rotating shaft 260 below a desired threshold. In this manner, the high speed assembly translates further and faster per rotation of shaft 260 than the low speed assembly, causing the lifting device 200 to reach a ground surface faster than if the high speed assembly were not present. Furthermore, in response to the lifting device 200 contacting a ground surface and the high speed assembly disengaging from the shaft 260, the reduced thread pitch of the low speed assembly takes advantage of the reduced torque required for extending the lifting device 200.

The thread pitch of threads 232 may be between 0.1 millimeters (mm) and 304.8 mm (between 0.0039 inches and 12 inches) in accordance with various embodiments, between 1 mm and 101.6 mm (between 0.039 inches and 4 inches) in accordance with various embodiments, between 2 mm and 76.2 mm (between 0.0787 inches and 3 inches) in accordance with various embodiments, and/or between 4 mm and 50.8 mm (between 0.157 inches and 2 inches) in accordance with various embodiments.

The thread pitch of threads 252 may be between 0.1 millimeters (mm) and 279.4 mm (between 0.0039 inches and 11 inches) in accordance with various embodiments, between 1 mm and 25.4 mm (between 0.039 inches and 1 inch) in accordance with various embodiments, between 1 mm and 6.35 mm (between 0.039 inches and 0.25 inches) in accordance with various embodiments, and/or between 2 mm and 3.175 mm (between 0.0787 inches and 0.125 inches) in accordance with various embodiments.

With reference to FIG. 2 and FIG. 4B, inner sleeve 230 may be keyed to outer tube 210 to prevent rotation of inner sleeve 230 with respect to outer tube 210. For example, inner sleeve 230 may comprise one or more axially extending grooves 234 (see FIG. 2) disposed in the outer diameter surface thereof and outer tube 210 may comprise corresponding protrusion(s) 216 extending radially inwards from an inner diameter surface thereof that extends into groove(s) 234.

Figure 5A:
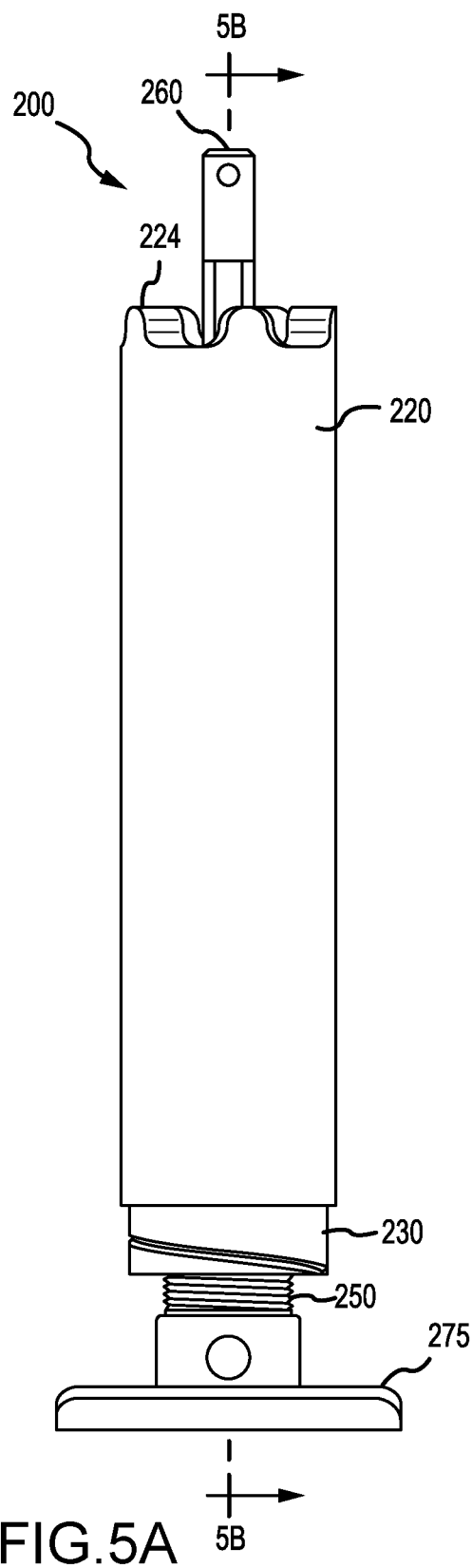
FIG. 5A and FIG. 5B illustrate a side view and a section view, respectively, of the lifting device of FIG. 4A and FIG. 4B, with an outer tube of the lifting device omitted for clarity purposes, in accordance with various embodiments.
Figure 5B:
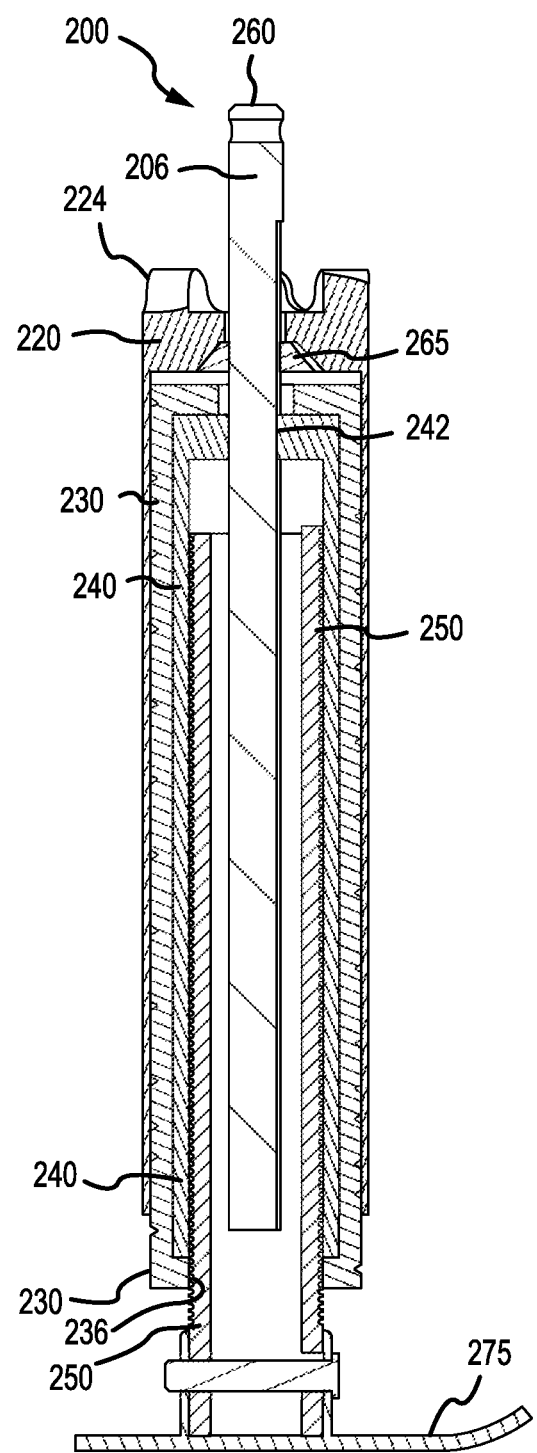

With reference to FIG. 5A and FIG. 5B, the lifting device of FIG. 4A with the outer tube, spring, and retaining member omitted is illustrated, in accordance with various embodiments. In various embodiments, translating screw 250 may be keyed to inner sleeve 230 to prevent rotation of translating screw 250 with respect to inner sleeve 230 and outer tube 210. For example, translating screw 250 may comprise one or more axially extending grooves 254 (see FIG. 2) disposed in the outer diameter surface thereof and inner sleeve 230 may comprise corresponding protrusion(s) 236 extending radially inwards from an inner diameter surface thereof that extends into groove(s) 254.

With reference to FIG. 6A and FIG. 6B, the lifting device of FIG. 5A with the outer sleeve 220 further omitted is illustrated, in accordance with various embodiments. Gear 265 may be slid onto shaft 260 just above inner sleeve 230, in accordance with various embodiments. Inner sleeve 230 may comprise a flange 238 at an upper end thereof extending radially inward to form an end wall through which shaft 260 extends. Furthermore, an upper end of outer sleeve 240 may abut flange 238.

Figures 7A, 7B:
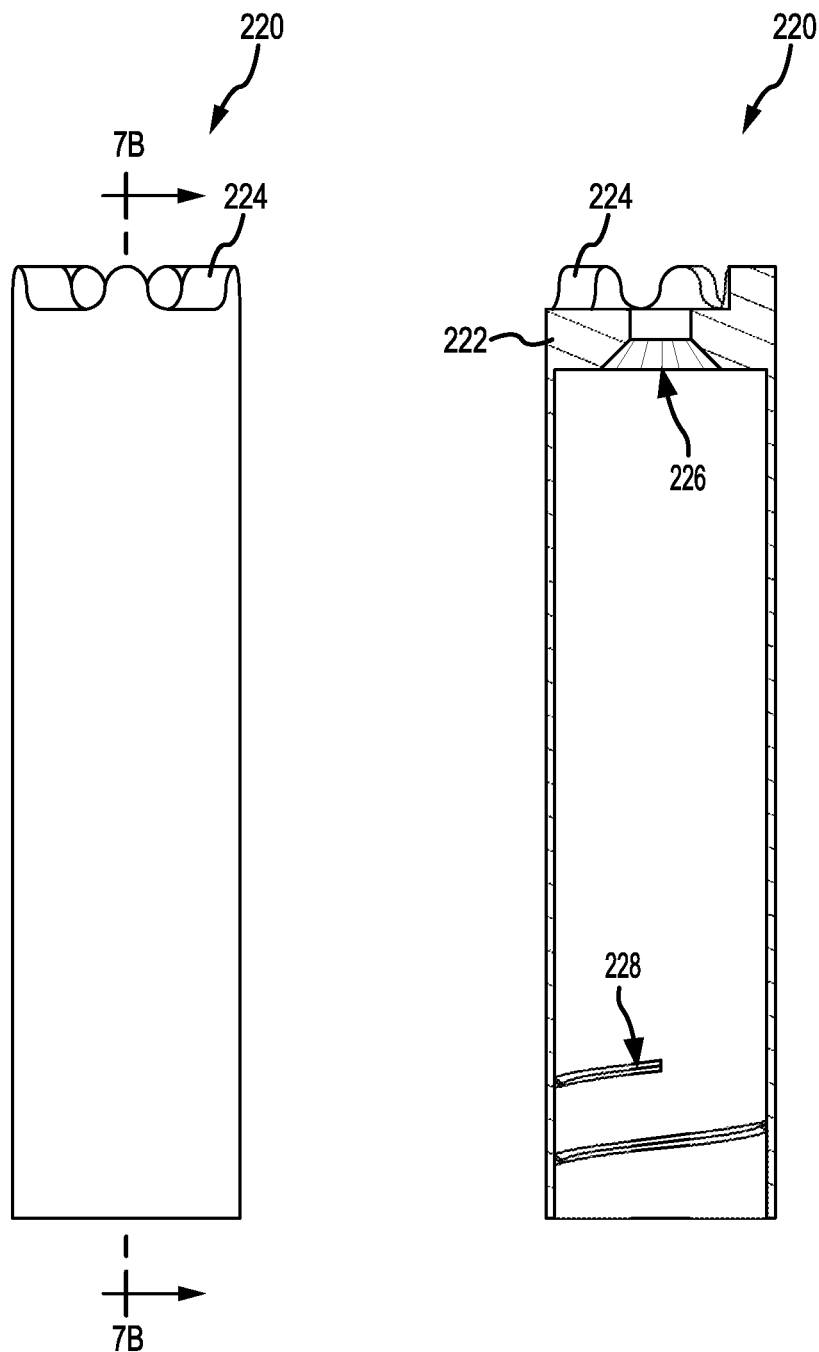
FIG. 7A and FIG. 7B illustrate a side view and a section view, respectively, of the high speed outer sleeve of FIG. 2, in accordance with various embodiments.

With reference to FIG. 7A and FIG. 7B, high speed outer sleeve 220 is illustrated, in accordance with various embodiments. Outer sleeve 220 may comprise a radially inward extending flange 222 forming an end wall at the upper end of outer sleeve 220. Shaft 260 (see FIG. 5B) may extend through flange 222. Outer sleeve 220 may comprise a plurality of teeth 226. Plurality of teeth 226 may be disposed on flange 222. Plurality of teeth 226 may be in meshing relationship with gear 265 (see FIG. 4B) in response to outer sleeve 220 moving to the first position whereby shaft 260 may be drivably coupled to shaft 260. Plurality of teeth 226 may further comprise crenulations to complement gear 265, in various embodiments. Outer sleeve 220 may comprise helically extending ridges 228 (also referred to herein as threads). Threads 228 may be disposed on an inner diameter surface of outer sleeve 220. Threads 228 may engage with complementary threads 232 (See FIG. 2) disposed on inner sleeve 230. Threads 228 and threads 232 may assist in translating rotational motion of outer sleeve 220 into linear motion of inner sleeve 230.

Figure 8A:
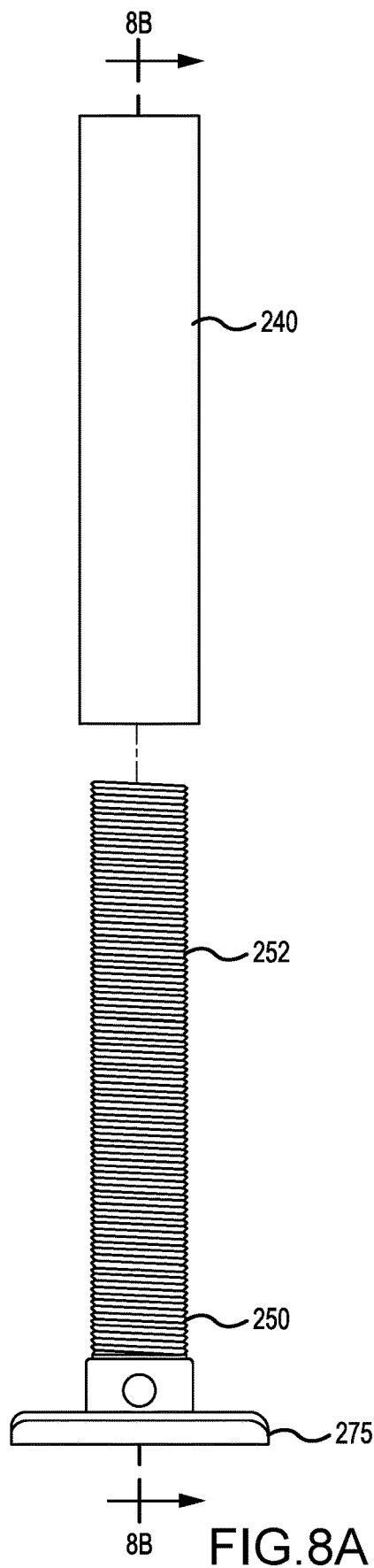
FIG. 8A and FIG. 8B illustrate a side view and a section view, respectively, of a partially exploded view of the low speed assembly of the lifting device of FIG. 2, in accordance with various embodiments.
Figure 8B:
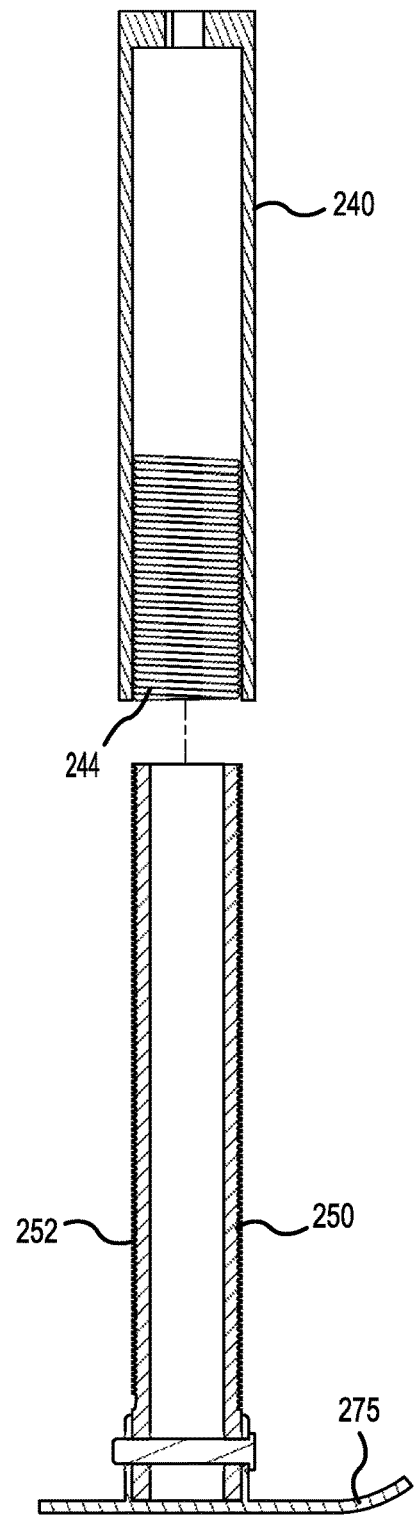

With reference to FIG. 8A and FIG. 8B, low speed assembly 204 is illustrated, in accordance with various embodiments. Outer sleeve 240 may comprise helically extending ridges 244 (also referred to herein as threads). Threads 244 may be disposed on an inner diameter surface of outer sleeve 240. Threads 244 may engage with complementary threads 252 disposed on translating screw 250. Threads 244 and threads 252 may assist in translating rotational motion of outer sleeve 240 into linear motion of translating screw 250.

Figure 9A:
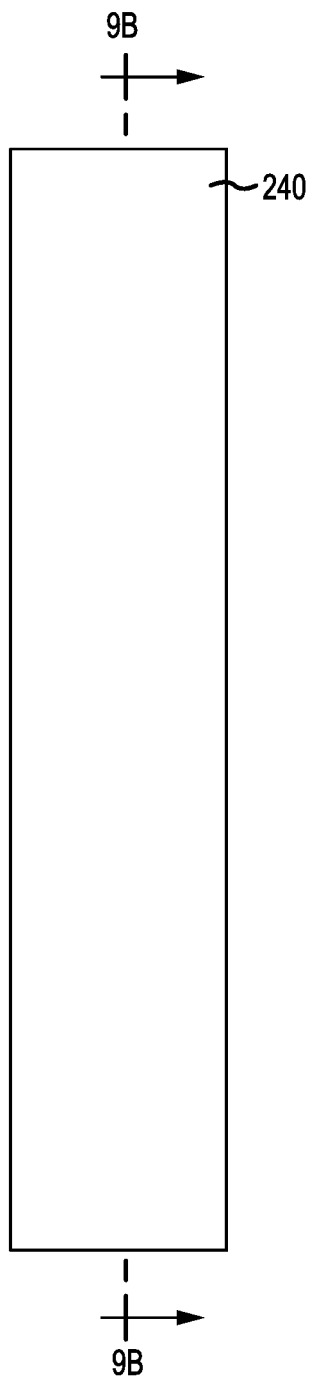
FIG. 9A, FIG. 9B, and FIG. 9C illustrate a side view, a section view, and a perspective view, respectively, of the low speed outer sleeve of FIG. 2, in accordance with various embodiments.
Figure 9B:
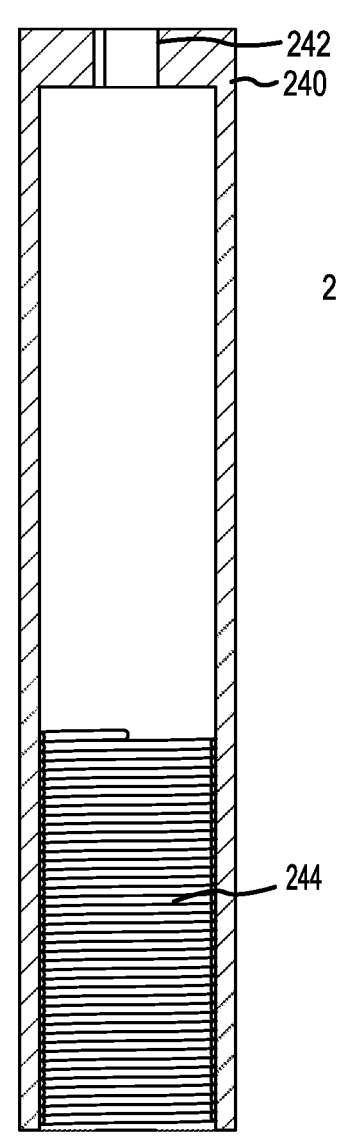
Figure 9C:
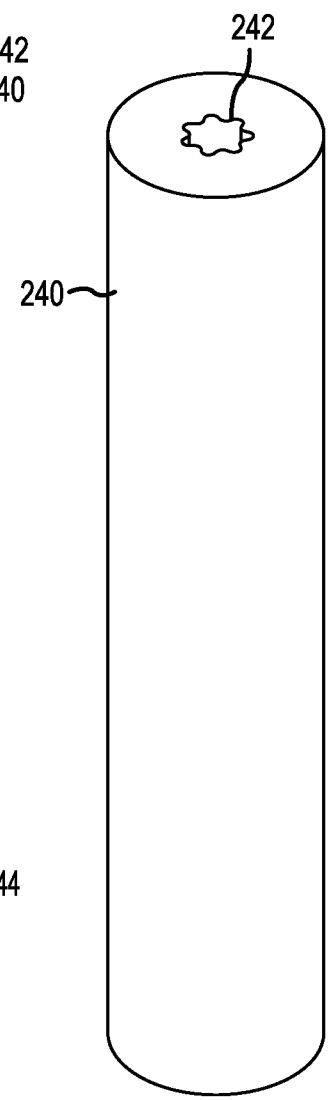

With reference to FIG. 9A, FIG. 9B, and FIG. 9C, low speed outer sleeve 240 is illustrated, in accordance with various embodiments. Outer sleeve 240 may comprise a radially inward extending flange 246 forming an end wall at the upper end of outer sleeve 240. Center aperture 242 may be disposed in flange 246. Shaft 260 (see FIG. 5B) may extend through flange 246.

Figures 10A, 10B:
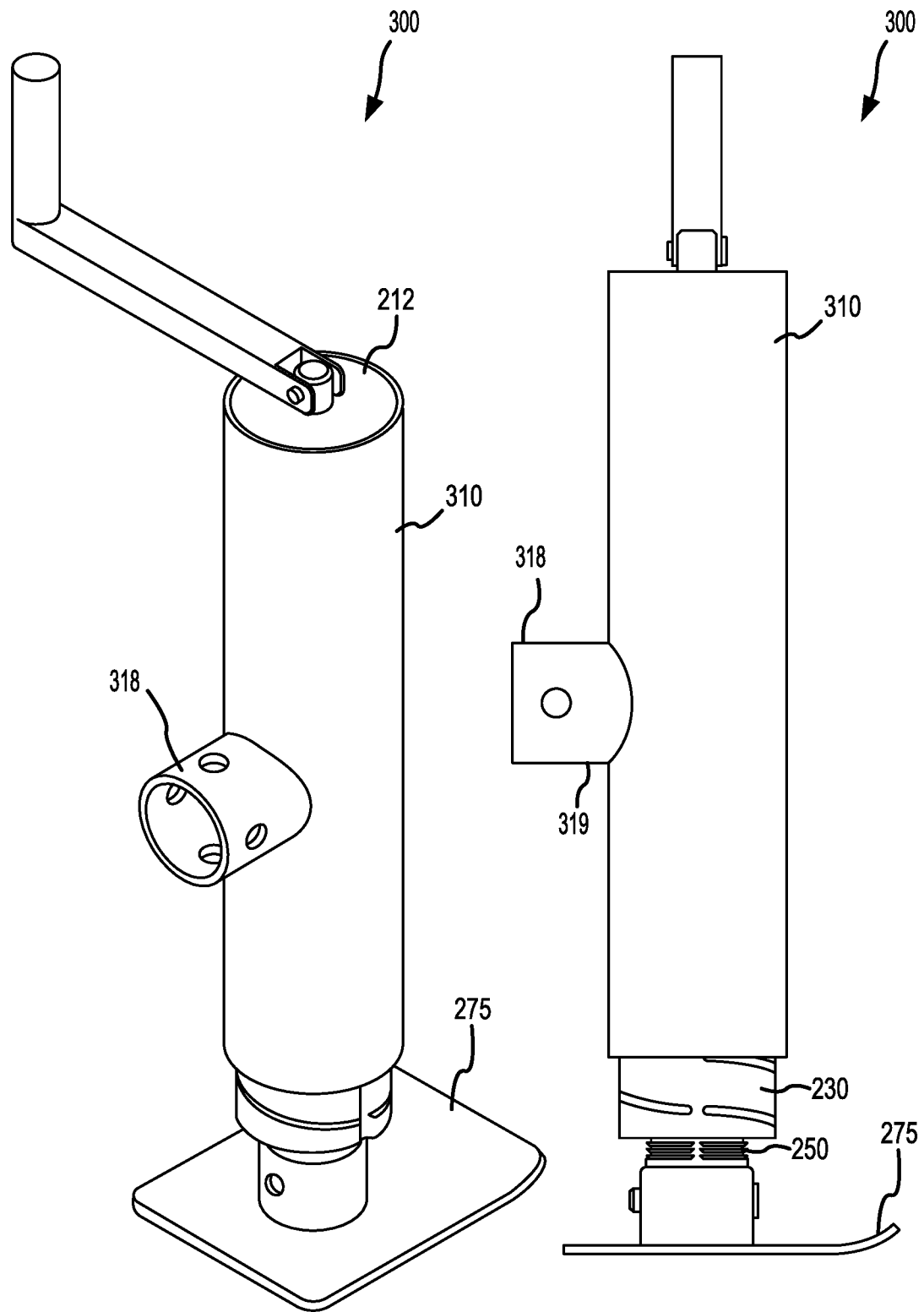
FIG. 10A and FIG. 10B illustrate a perspective view and a side view, respectively, of a lifting device comprising an attachment feature, in accordance with various embodiments.

With respect to FIG. 10A and FIG. 10B, elements with like element numbering, as depicted in FIG. 2, are intended to be the same and will not necessarily be repeated for the sake of clarity.

With reference to FIG. 10A and FIG. 10B, a lifting device 300 with an attachment feature 318 coupled to the outer tube 310 is illustrated, in accordance with various embodiments. Lifting device 300 may be similar to lifting device 200 of FIG. 2. Lifting device 300 may be attached to a trailer (e.g., trailer 120 of FIG. 1) via attachment feature 318. In this manner, outer tube 310 may be substantially fixed to the trailer during operation, thereby preventing rotation of outer tube 310 and supporting the trailer. Attachment feature 318 may comprise a tube 319 coupled to the outer diameter surface of outer tube 310 for attaching the lifting device 300 to a trailer in a known manner. Tube 319 may be oriented substantially perpendicular with respect to outer tube 310. Tube 319 may provide a pivot connection between lifting device 300 and a trailer or vehicle to allow lifting device 300 to be rotated between a stowed position and a deployed position.

Figure 11A:
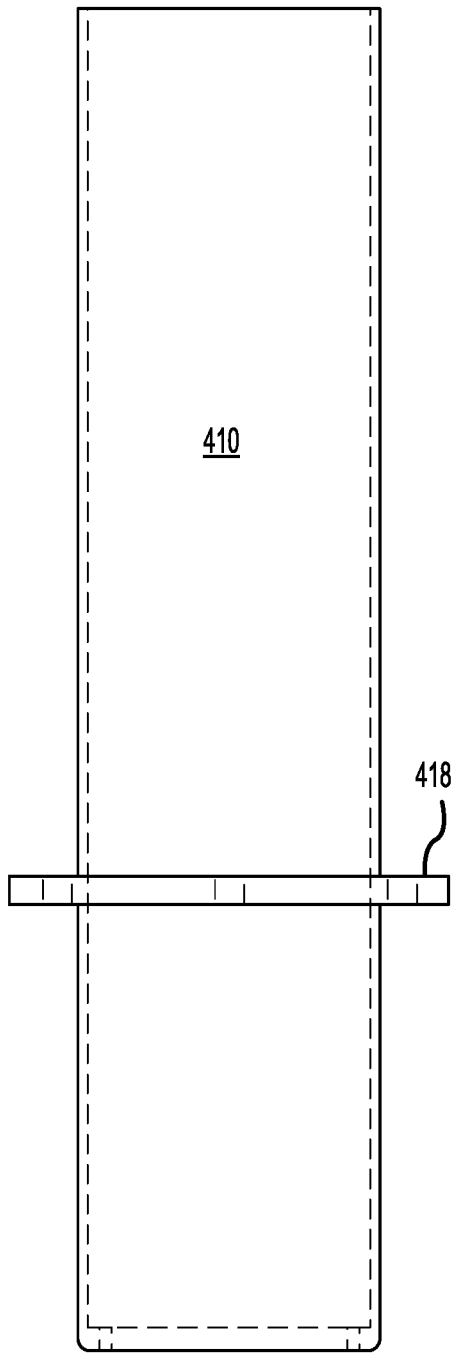
FIG. 11A and FIG. 11B illustrate a section view and a perspective view, respectively, of an outer tube of a lifting device comprising an attachment feature for attaching the lifting device to a trailer, in accordance with various embodiments.
Figure 11B:
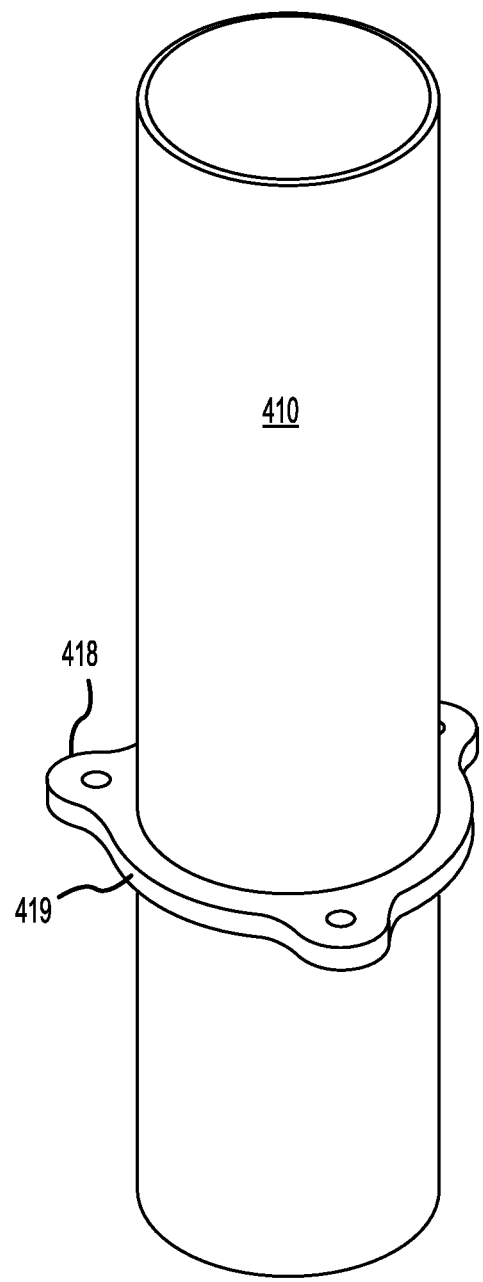

With reference to FIG. 11A and FIG. 11B, an outer tube 410 comprising an attachment feature 418 is illustrated, in accordance with various embodiments. Outer tube 410 may be similar to outer tube 210 of FIG. 2. Attachment feature 418 may comprise a collar 419 coupled to an surrounding the outer diameter surface of outer tube 410. Collar 419 may comprise a plurality of apertures for coupling collar 419 to a trailer or vehicle via a plurality of fasteners, such as bolts, in a known manner. Collar 419 may be coupled to outer tube 410 via a metal joining process, such as welding for example. In various embodiments, outer tube 410 may be welded directly to a trailer or vehicle, without the use of a dedicated attachment feature.

Figure 12:
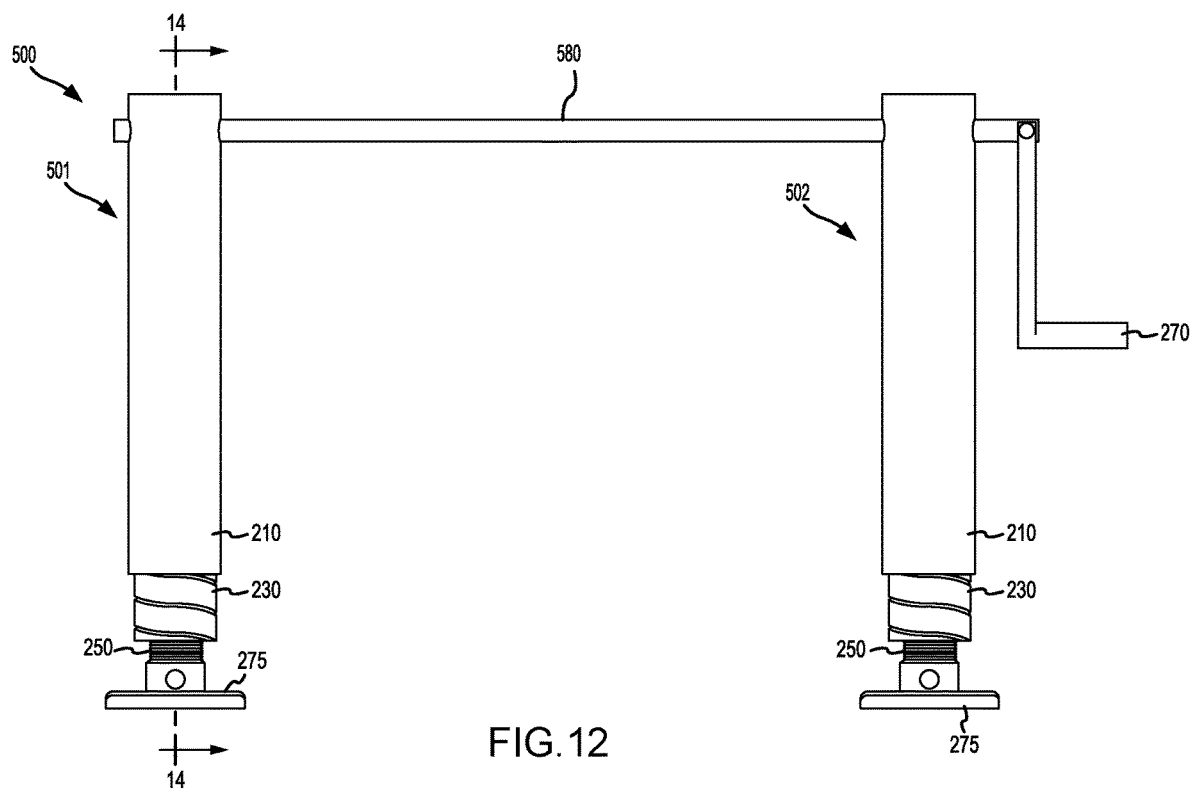
FIG. 12 illustrates a landing gear assembly having two lifting devices, in accordance with various embodiments.

With respect to FIG. 12, elements with like element numbering, as depicted in FIG. 2, are intended to be the same and will not necessarily be repeated for the sake of clarity.

Figure 13A:
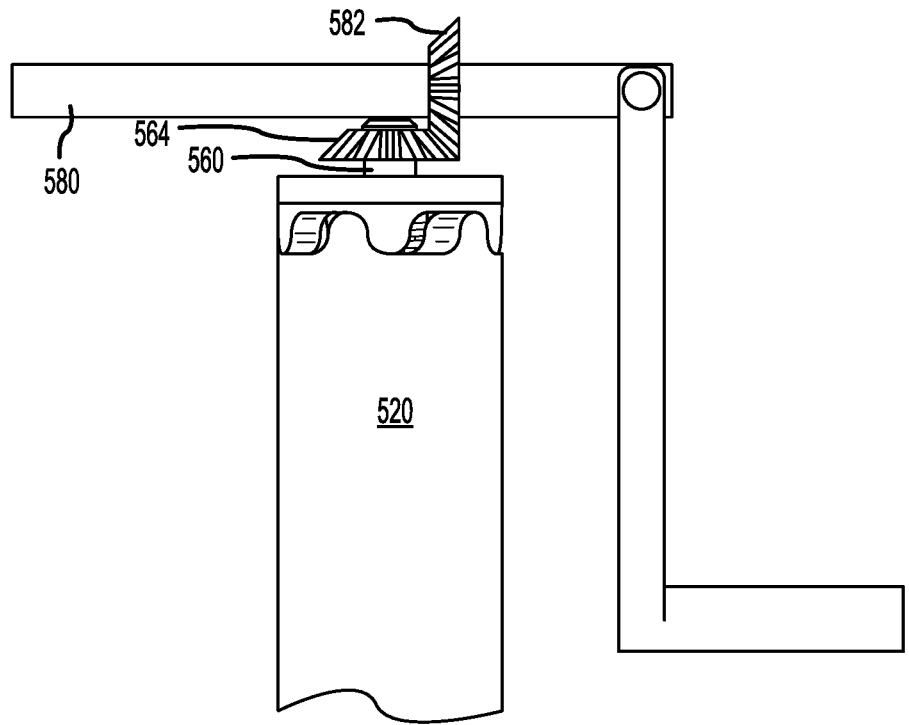
FIG. 13A and FIG. 13B illustrate a lifting device for the landing gear assembly of FIG. 12 with an outer sleeve of the lifting device in a first position and a second position, respectively, and comprising a shaft driven by a crank with the outer tube removed for clarity purposes, in accordance with various embodiments.
Figure 13B:
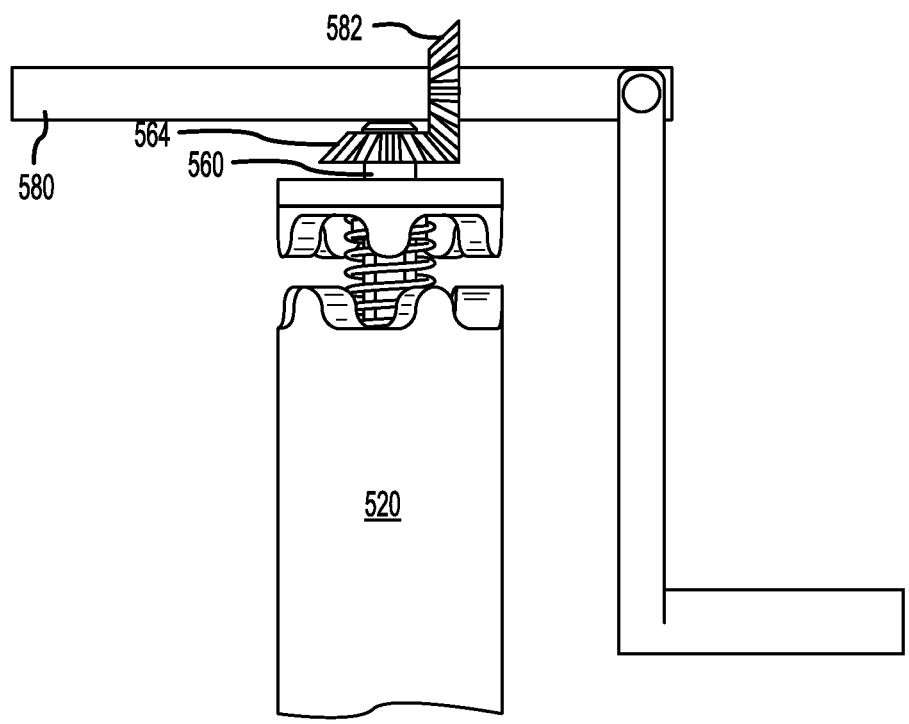

With reference to FIG. 12, a trailer landing gear assembly 500 is illustrated, in accordance with various embodiments. Some trailers may use landing gear, generally comprising a pair of retractable legs, at the front end of the trailer to support said front end when the trailer is to be detached from a truck or tractor. Landing gear assembly 500 has a driven crank 580 which passes through the upper ends of a pair of telescoping, vertical legs or lifting devices 501, 502. With additional reference to FIG. 13A and FIG. 13B, each lifting device 501, 502 may be similar to lifting device 200 of FIG. 2, except that the upper end of the shaft 560 of the lifting device bears a gear 564 (also referred to herein as a second gear) in meshing relation with a gear 582 (also referred to herein as a third gear) disposed on the crank 580. In this manner, rotation of crank 580 drives rotation of shaft 560. Crank 580 is disposed substantially perpendicular with respect to shaft 560. Gear 564 may be a bevel gear. Gear 582 may be a bevel gear. However, other types of gears known for connecting perpendicularly disposed rods may be used without departing from the spirit and scope of the present disclosure.

Figure 14:
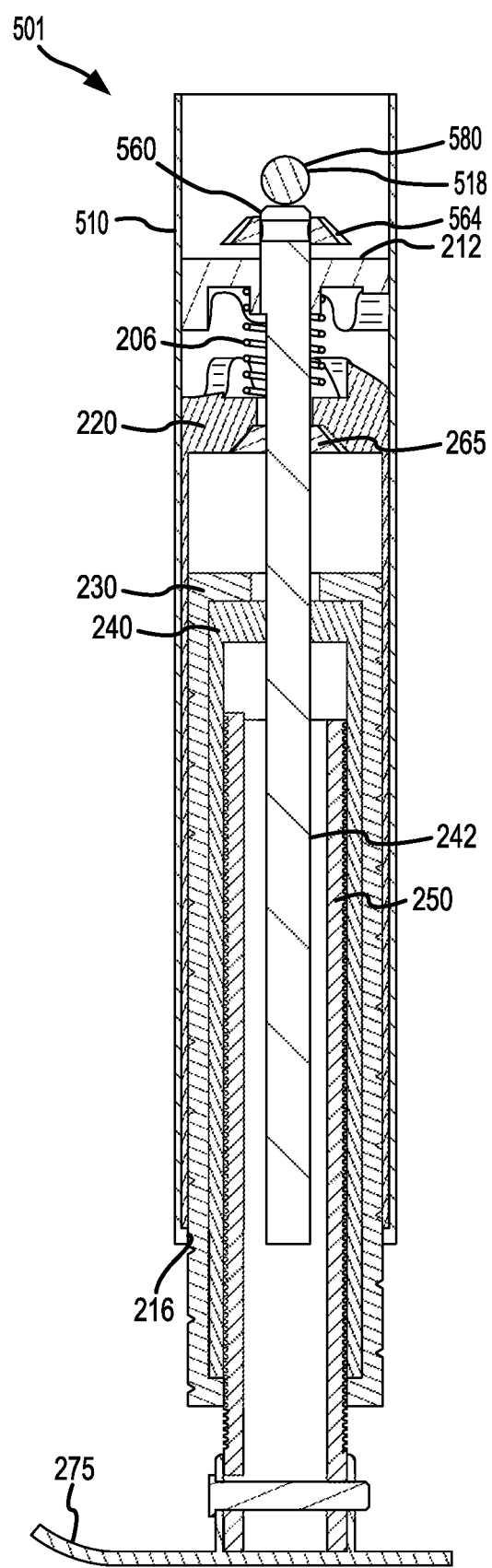
FIG. 14 illustrates a section view of one of the lifting devices of FIG. 12, in accordance with various embodiments.

With reference to FIG. 14, a cross-section view of lifting device 501 is illustrated, in accordance with various embodiments. Outer tube 510 may comprise one or more aligned apertures 518 disposed in the upper end of outer tube 510 through which crank 580 extends.

With reference to FIG. 15A and FIG. 15B, a lifting device 600 is illustrated, in accordance with various embodiments. Lifting device 600 may be similar to lifting device 200 (e.g., see FIG. 2 and FIG. 4B), except that, instead of the low speed assembly having a rotating outer sleeve and a translating screw, the low speed assembly of lifting device 600 has a rotating screw 650 and a translating outer sleeve 640.

Lifting device 600 may comprise a shaft 660 operatively coupled to rotating screw 650 such that rotating screw 650 rotates with shaft 660. In various embodiments, shaft 660 may comprise one or more splines 662 and rotating screw 650 may comprise a center aperture 656 comprising a geometry that is complementary to shaft 660. In this regard, center aperture 656 may comprise one or more grooves configured to receive the one or more splines 662 of shaft 660 such that shaft 660 interlocks with rotating screw 650 to impart rotational forces (i.e., torque) therebetween. Stated differently, aperture 656 and shaft 660 may be coupled via a splined connection. Rotating screw 650 may be drivably coupled to shaft 660 via center aperture 656. Center aperture 656 may comprise various geometries, such as triangular, square, or any other geometry that interlocks shaft 660 with rotating screw 650. Shaft 660 may be operatively coupled to rotating screw 650 using various methods without departing from the scope and spirit of the present disclosure, such as via a fastener, for example.

In operation, rotation of shaft 660 in a first rotational direction, e.g., via handle 670, causes rotating screw 650 to rotate with respect outer tube 610 and translating outer sleeve 640, which in turn causes translating outer sleeve 640 to extend from rotating screw 650. Conversely, rotation of shaft 660 in a second rotational direction (opposite the first rotational direction) causes rotating screw 650 to rotate with respect outer tube 610 and translating outer sleeve 640, which in turn causes translating outer sleeve 640 to retract into outer tube 610.

With reference to FIG. 16, an exploded view of a lifting device 700 is illustrated, in accordance with various embodiments. Lifting device 700 may be a linear jack. Lifting device 700 may operate similar to lifting device 200, except that instead of comprising a low speed assembly nested within a high speed assembly, lifting device 700 of FIG. 16 comprises a high speed assembly 702 nested within a low speed assembly 704.

Lifting device 700 may generally comprise an outer tube 710, a high speed assembly 702, and a low speed assembly 704. High speed assembly 702 may generally comprise a screw mechanism comprising a rotating screw threadedly coupled to a translating nut. In various embodiments, high speed assembly 702 comprises a translating outer sleeve 720 (also referred to herein as a high speed outer sleeve or a first outer sleeve), and a rotating screw 730 (also referred to herein as a high speed inner sleeve, or a rotating inner sleeve). Low speed assembly 704 may generally comprise a screw mechanism comprising a rotating screw threadedly coupled to a translating nut. Low speed assembly 704 may comprise a translating outer sleeve 740 (also referred to herein as a low speed outer sleeve or a second outer sleeve), and a rotating inner sleeve 750 (also referred to herein as a low speed inner sleeve).

Outer tube 710 may comprise a centerline axis 792. Outer tube 710 may be hollow. Outer sleeve 740 may be disposed at least partially within outer tube 710. Outer sleeve 740 may be hollow. Inner sleeve 750 may be disposed at least partially within outer sleeve 740. Inner sleeve 750 may be hollow. Outer sleeve 720 may be disposed at least partially within inner sleeve 750. Outer sleeve 720 may be hollow. Rotating screw 730 may be disposed at least partially within outer sleeve 720. Rotating screw 730 may be hollow. Lifting device 700 may further comprise a shaft 760 (also referred to herein as a first shaft). Shaft 760 may be hollow. Lifting device 700 may further comprise a shaft 766 (also referred to herein as a second shaft). Shaft 760 may be disposed at least partially within rotating screw 730. Shaft 766 may be disposed at least partially within shaft 760. Shaft 766 may be disposed at least partially within rotating screw 730. In this regard, the inner diameter of outer tube 710 may be greater than the outer diameter of outer sleeve 740. The inner diameter of outer sleeve 740 may be greater than the outer diameter of inner sleeve 750. The inner diameter of inner sleeve 750 may be greater than the outer diameter of outer sleeve 720. The inner diameter of outer sleeve 720 may be greater than the outer diameter of rotating screw 730. Outer tube 710, outer sleeve 740, inner sleeve 750, outer sleeve 720, rotating screw 730, shaft 760, and shaft 766 may be coaxially aligned.

Lifting device 700 may further comprise a gear 765. Gear 765 may be coupled to, and rotate with, shaft 760. Gear 765 may be coaxially aligned with shaft 760. Shaft 760 may drive rotating screw 730 via gear 765 in response to rotating screw 730 moving to a first position with respect to shaft 760, as described in further detail herein.

Figures 17A, 17B:
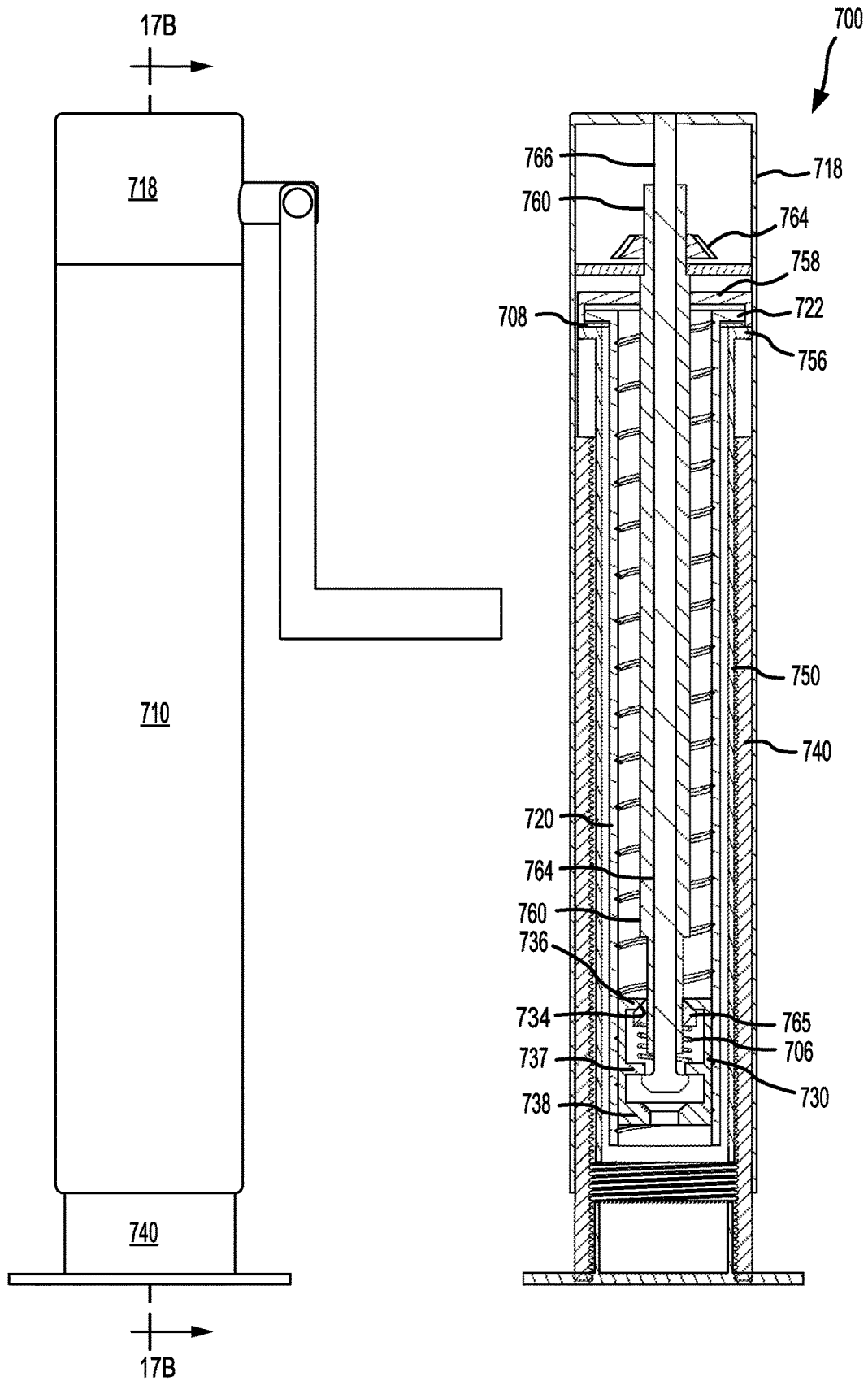
FIG. 17A and FIG. 17B illustrate a side view and a section view, respectively, of the lifting device of FIG. 16, with the lifting device in a retracted state, and a high speed rotating screw in a first position, in accordance with various embodiments.

Lifting device 700 may further comprise a spring 706. Spring 706 may be operatively coupled to rotating screw 730, to assist movement of rotating screw 730 between the first position and a second position, as described herein in further detail. In this regard, rotating screw 730 may be slidable in the outer tube 210 between the first position and the second position. Rotating screw 730 may comprise a mating surface 734. Mating surface 734 may be in meshing relationship with gear 765 in response to rotating screw 730 moving to the first position, as illustrated in FIG. 17B. Mating surface 734 may comprise a plurality of teeth. Rotating screw 730 may comprise a flange 736 extending radially inward from an inner diameter surface of rotating screw 730. Mating surface 734 may be disposed on flange 736. Shaft 760 may extend through flange 736 of rotating screw 730. Rotating screw 730 may comprise a flange 737 extending radially inward from the inner diameter surface of rotating screw 730. Shaft 766 may extend through flange 737 of rotating screw 730. Spring 706 may be disposed between flange 736 and flange 737. Spring 706 may be compressed between flange 737 and gear 765. Rotating screw 730 may comprise a flange 738 extending radially inward from the inner diameter surface of rotating screw 730. Flange 737 may be disposed axially between and spaced apart from flange 736 and flange 738. Shaft 766 may be spaced apart from flange 738 of rotating screw 730 in response to rotating screw 730 moving to the first position, as illustrated in FIG. 17B. Shaft 766 may engage (i.e., may enter into contact with) flange 738 of rotating screw 730 in response to rotating screw 730 moving to the second position, as illustrated in FIG. 17D. In response to rotating screw 730 moving to the second position, shaft 766 may be in meshing relation with flange 738 to prevent rotation of rotating screw 730 with respect to shaft 766 and/or shaft 760. In this manner, rotating screw 730 may be restricted from rotating within outer tube 210 in the second position.

In various embodiments, rotating screw 730 is threadedly coupled to outer sleeve 720. Thus, rotation of the rotating screw 730 causes the outer sleeve 720 to translate with respect to outer tube 210. Stated differently, high speed assembly 702 translates rotational motion of rotating screw 730 to linear motion of outer sleeve 720. In various embodiments, inner sleeve 750 is threadedly coupled to outer sleeve 740. Thus, rotation of the inner sleeve 750 causes the outer sleeve 740 to translate with respect to outer tube 710. Stated differently, low speed assembly 204 translates rotational motion of inner sleeve 750 to linear motion of outer sleeve 740.

Outer sleeve 720 may comprise a flange 722 extending radially outward from an outer diameter surface of outer sleeve 720 at the upper end thereof. Inner sleeve 750 may comprise a flange 756 extending radially outward from an outer diameter surface of inner sleeve 750 at the upper end thereof. Outer sleeve 720 may rotate with respect to inner sleeve 750. A bearing 708 may be disposed between flange 722 and flange 756 to reduce friction between outer sleeve 720 and inner sleeve 750. Bearing 708 may comprise a thrust needle roller bearing or the like, in accordance with various embodiments.

In various embodiments, the upper end of the shaft 760 may bear a gear 764 in meshing relation with a gear 782 disposed on a crank 780. In this manner, rotation of crank 780 drives rotation of shaft 760. Crank 780 may be disposed substantially perpendicular with respect to shaft 760. Gear 764 may be a bevel gear. Gear 782 may be a bevel gear. However, other types of gears known for connecting perpendicularly disposed rods may be used without departing from the spirit and scope of the present disclosure. One end of crank 780 may bear a handle 770 which may be used for rotating the crank 780.

A radially inward extending flange 712 may be disposed at an upper end of outer tube 710. Shaft 760 may extend through flange 712. Shaft 760 may be at least partially supported by flange 712. Shaft 760 may comprise a shoulder which abuts flange 712. In this manner, flange 712 may prevent shaft 760 from translating within outer tube 710. A cap 718 may be coupled to the upper end of outer tube 710. Cap 718 may enclose gear 782 and gear 764. Cap 718 may comprise an aperture 719 through which crank 780 extends. Crank 780 may be supported by cap 718.

With combined reference to FIG. 16 and FIG. 17B, shaft 760 may be operatively coupled to inner sleeve 750 such that inner sleeve 750 rotates with shaft 760. In various embodiments, shaft 760 may comprise one or more splines 762 and inner sleeve 750 may comprise a center aperture 759 comprising a geometry that is complementary to shaft 760. In this regard, center aperture 759 may comprise one or more grooves configured to receive the one or more splines 762 of shaft 760 such that shaft 760 interlocks with inner sleeve 750 to impart rotational forces (i.e., torque) therebetween. Stated differently, aperture 759 and shaft 760 may be coupled via a splined connection. Inner sleeve 750 may be drivably coupled to shaft 760 via center aperture 759. Furthermore, although illustrated as a star shaped aperture, center aperture 759 may comprise various geometries, such as triangular, square, or any other geometry that interlocks shaft 760 with inner sleeve 750. However, shaft 760 may be operatively coupled to inner sleeve 750 using various methods without departing from the scope and spirit of the present disclosure, such as via a fastener, for example.

Inner sleeve 750 may comprise a cap 758 coupled to flange 756. Flange 722 may be installed in a gap formed between cap 758 and flange 756. Bearing 708 may similarly be installed in the gap formed between cap 758 and flange 756. Center aperture 759 may be disposed in cap 758. Cap 758 may be coupled to inner sleeve 750 via any suitable connection, including welding, fasteners, a threaded connection, etc.

In operation, rotation of shaft 760 in a first rotational direction, e.g., via handle 770, causes inner sleeve 750 to rotate with respect outer tube 710 and translating outer sleeve 740, which in turn causes translating outer sleeve 740 to extend from outer tube 710 (see FIG. 17C and FIG. 17D). Conversely, rotation of shaft 760 in a second rotational direction (opposite the first rotational direction) causes inner sleeve 750 to rotate with respect outer tube 710 and translating outer sleeve 740, which in turn causes translating outer sleeve 740 to retract into outer tube 710 (see FIG. 17A and FIG. 17B).

Furthermore, with rotating screw 730 in a first position (see FIG. 17A and FIG. 17B) with respect to outer tube 710, rotating screw 730 may be drivably coupled to shaft 760. Stated differently, rotation of shaft 760 may drive rotation of rotating screw 730. In operation, and with rotating screw 730 in a first position (see FIG. 4A through FIG. 4D) with respect to outer tube 710 and/or gear 765, rotation of shaft 760 in a first rotational direction, e.g., via handle 770, may cause rotating screw 730 to rotate with respect outer tube 710 and outer sleeve 720, which in turn causes outer sleeve 720 to translate with respect to rotating screw 730 and extend from outer tube 710. Conversely, rotation of shaft 760 in a second rotational direction (opposite the first rotational direction) may cause rotating screw 730 to rotate with respect outer tube 710 and outer sleeve 720, which in turn causes outer sleeve 720 to retract into outer tube 710. In the first position, spring 706 may bias rotating screw 730 to engage with gear 765. Thus, with the rotating screw 730 in the first position, both the outer sleeve 720 and the outer sleeve 740 are driven to translate with respect to outer tube 710 in response to rotation of shaft 760.

However, in operation and with rotating screw 730 in a second position (see FIG. 17C and FIG. 17D) with respect to outer tube 710 and/or gear 765, the rotating screw 730 is disengaged from gear 765 (i.e., rotation of shaft 760 and gear 765 does not drive rotation of rotating screw 730 in the disengaged position). In this regard, with rotating screw 730 in the second position, rotation of shaft 760 in the first rotational direction or the second rotational direction may cause only inner sleeve 750 (and not rotating screw 730) to rotate with respect to outer tube 710 and outer sleeve 720, thereby driving only the outer sleeve 740 to translate. Stated differently, the high speed assembly 702 (i.e., the rotating screw 730 and outer sleeve 720) may be disengaged from operation in response to the rotating screw 730 moving to the second position. In this manner, in response to rotation of shaft 760 in the first direction, both the high speed assembly 702 and the low speed assembly 704 are driven to increase the overall length of lifting device 700. With momentary reference to FIG. 17C and FIG. 17D, as the overall length of lifting device 700 is increased, the foot 775 of the lifting device 700 may contact a ground surface 790, thereby imparting a force 794 from the ground surface 790 into the rotating screw 730 which causes the rotating screw 730 to move with respect to outer tube 710 against the bias of spring 706 from the first position (i.e., engaged with gear 765) to the second position (i.e., disengaged from gear 765) thereby decoupling rotating screw 730 from torsional forces imparted by shaft 760. In this regard, before the lifting device 700 has contacted a ground surface, the overall length of the lifting device 700 is quickly increased to reduce the overall number of rotations of shaft 760 required to cause lifting device 700 to reach the ground. In response to contacting the ground, the high speed assembly 702 is decoupled from the shaft 760 to take advantage of the mechanical advantage of the low speed assembly 704.

In various embodiments, rotating screw 730 comprises helically extending grooves or threads 732. In various embodiments, inner sleeve 750 comprises helically extending grooves and/or threads 752. The thread pitch of threads 732 may be greater than the thread pitch of threads 752. Stated differently, inner sleeve 750 may comprise more threads per inch (TPI) than rotating screw 730. In various embodiments, the thread pitch of threads 732 is more than twice as large as the thread pitch of threads 752. In various embodiments, the thread pitch of threads 732 is more than three times as large as the thread pitch of threads 752. In various embodiments, the thread pitch of threads 732 is more than four times as large as the thread pitch of threads 752. It should be understood that the maximum thread pitch may be limited by the moment arm for torque applied to the shaft 760 and may be limited below a desired threshold to reduce the torque requirement for rotating shaft 760. In this manner, the high speed assembly 702 translates further and faster per rotation of shaft 760 than the low speed assembly 704, causing the lifting device 700 to reach a ground surface faster than if the high speed assembly were not present. Furthermore, in response to the lifting device 700 contacting a ground surface and the high speed assembly 702 disengaging from the shaft 760, the reduced thread pitch of the low speed assembly 704 is taken advantage of to reduce the torque required for extending the lifting device 700.

With reference to FIG. 16 and FIG. 17D, outer sleeve 740 may be keyed to outer tube 710 to prevent rotation of outer sleeve 740 with respect to outer tube 710. For example, outer sleeve 740 may comprise one or more axially extending grooves 748 (see FIG. 16) disposed in the outer diameter surface thereof and outer tube 710 may comprise corresponding protrusion(s) 716 (see FIG. 17D) extending radially inwards from an inner diameter surface thereof that extend(s) into groove(s) 748.

Figure 18:
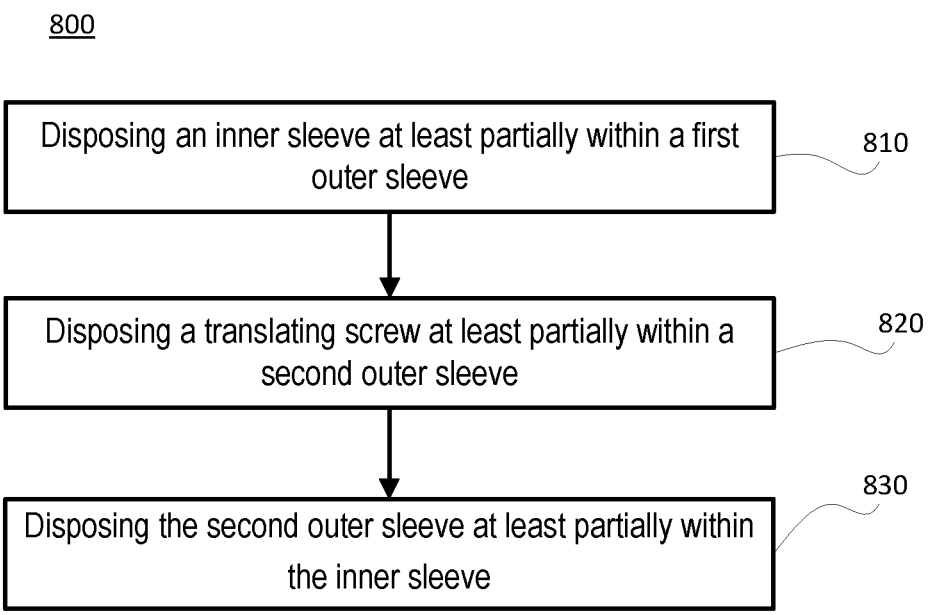
FIG. 18 illustrates a flow chart of a method of manufacturing a lifting device, in accordance with various embodiments.

With reference to FIG. 18, a flow chart of a method 800 of manufacturing a lifting device, such as a linear jack, is illustrated, in accordance with various embodiments. Method 800 includes disposing an inner sleeve at least partially within a first outer sleeve (step 810). Method 800 includes disposing a translating screw at least partially within a second outer sleeve (step 820). Method 800 includes disposing the second outer sleeve at least partially within the inner sleeve (step 830).

With combined reference to FIG. 2 and FIG. 18, step 810 may include threading inner sleeve 230 into outer sleeve 220. Step 820 may include threading screw 250 into outer sleeve 240. Step 830 may include moving outer sleeve 240 at least partially into inner sleeve 230. Outer sleeve 220 may be moved into outer tube 210 via the open upper end of outer tube 210 prior to retaining member 212 being coupled to the upper end of outer tube 210.

Figures 19A, 19B:
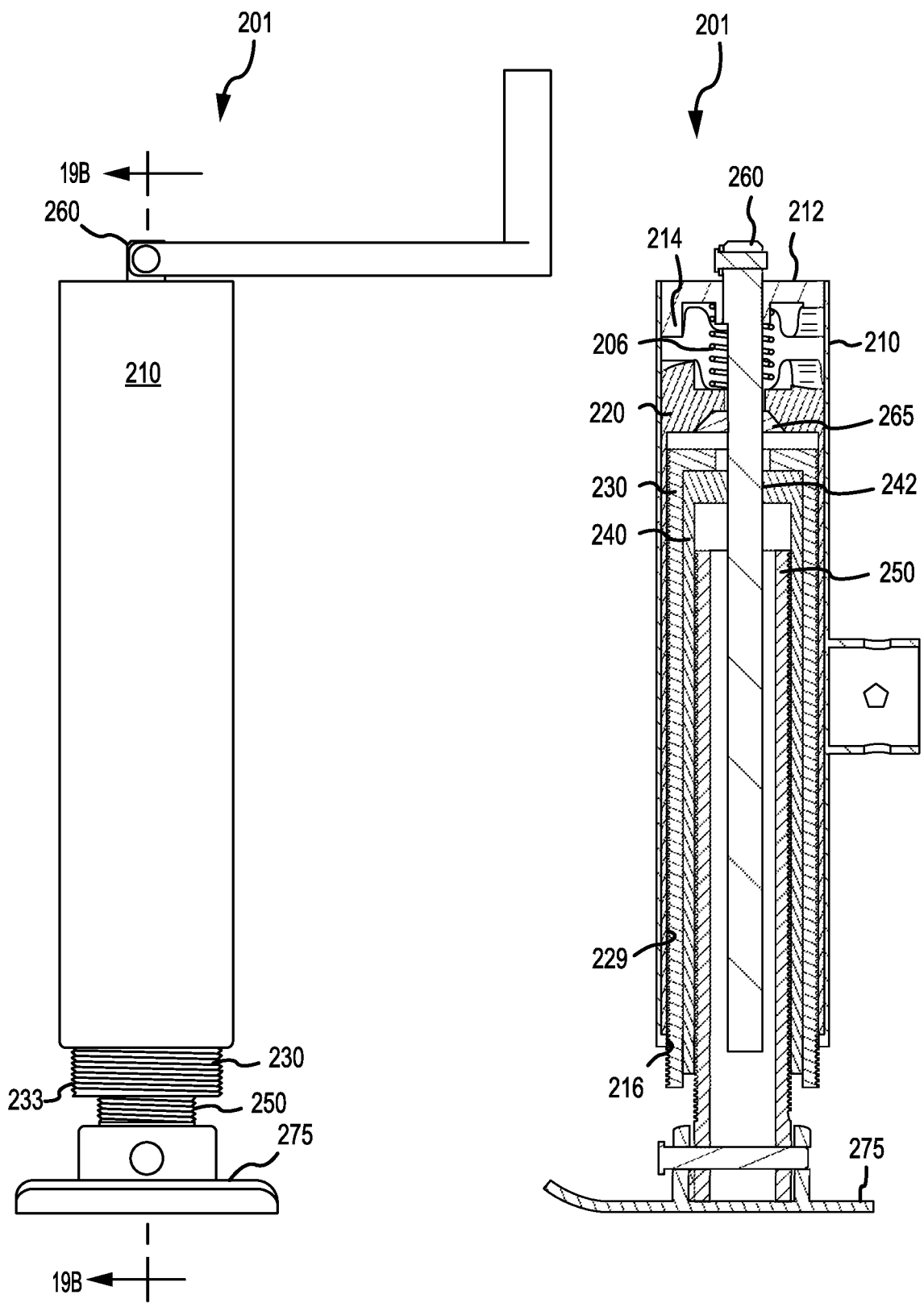
FIG. 19A and FIG. 19B illustrate a side view and a section view, respectively, of a lifting device comprising a first jack screw assembly including a thread pitch that is equal to a second jack screw assembly, in accordance with various embodiments.

With respect to FIG. 19A and FIG. 19B, elements with like element numbering, as depicted in FIG. 4A and FIG. 4B, are intended to be the same and will not necessarily be repeated for the sake of clarity.

With reference to FIG. 19A and FIG. 19B, a lifting device 201 is illustrated, in accordance with various embodiments. Lifting device 201 may be similar to lifting device 200 of FIG. 2, except that the thread pitch of inner sleeve 230 and outer sleeve 220 is equal to the thread pitch of outer sleeve 240 and screw 250. In this regard, outer sleeve 220 may comprise helically extending threads 229. Threads 229 may be disposed on an inner diameter surface of outer sleeve 220. Inner sleeve 230 may comprise helically extending threads 233. Threads 233 may be disposed on an outer diameter surface of inner sleeve 230. The thread pitch of threads 233 and threads 229 may be equal to the thread pitch of threads 252 of screw 250 and threads 244 of outer sleeve 240 (see FIG. 8A and FIG. 8B).

Figure 20:
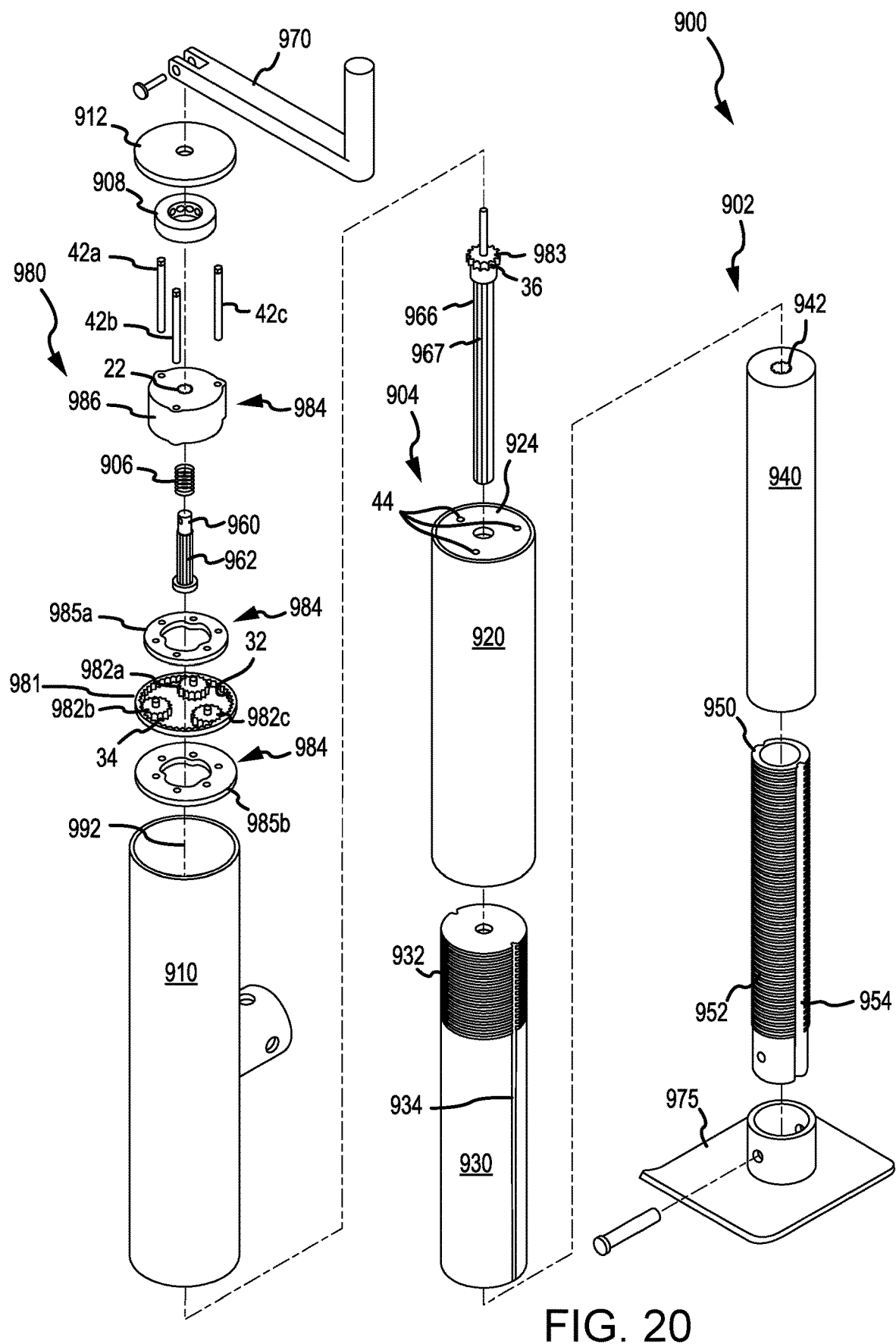
FIG. 20 illustrates an exploded view of a lifting device comprising a planetary gear system, in accordance with various embodiments.

With reference to FIG. 20, an exploded view of a lifting device 900 is illustrated, in accordance with various embodiments. Lifting device 900 may be a linear jack. Lifting device 900 may generally comprise an outer tube 910, a high speed assembly 902, and a low speed assembly 904. High speed assembly 902 may generally comprise a screw mechanism comprising a rotating nut threadedly coupled to a translating screw, in the manner of a leadscrew or jack screw. In various embodiments, high speed assembly 902 comprises a rotating outer sleeve 940, and a translating screw 950. Low speed assembly 904 may generally comprise a screw mechanism comprising a rotating nut threadedly coupled to a translating screw. Low speed assembly 904 may comprise a rotating outer sleeve 920, and a translating inner sleeve 930.

Although the present disclosure is described in accordance with various embodiments on the basis of a screw mechanism having a rotating nut and a translating screw, it should be understood that the present disclosure can be applied with a rotating screw and a translating nut, as illustrated in FIG. 15A and/or FIG. 16, for example.

Outer tube 910 may comprise a centerline axis 992. Outer tube 910 may be hollow. Outer sleeve 920 may be disposed at least partially within outer tube 910. In various embodiments, outer sleeve 920 is placed into the open upper end of outer tube 910 prior to retaining member 912 being coupled to outer tube 910. Outer sleeve 920 may be hollow. Inner sleeve 930 may be disposed at least partially within outer sleeve 920. Inner sleeve 930 may be hollow. Outer sleeve 940 may be disposed at least partially within inner sleeve 930. Outer sleeve 940 may be hollow. Translating screw 950 may be disposed at least partially within outer sleeve 940. Translating screw 950 may be hollow. Lifting device 900 may further comprise a shaft 960 (also referred to herein as an input shaft). Shaft 960 may be disposed at least partially within outer tube 910. Lifting device 900 may further comprise a shaft 966 (also referred to herein as an output shaft). Shaft 960 may be disposed at least partially within screw 950. In this regard, the inner diameter of outer tube 910 may be greater than the outer diameter of outer sleeve 920. The inner diameter of outer sleeve 920 may be greater than the outer diameter of inner sleeve 930. The inner diameter of inner sleeve 930 may be greater than the outer diameter of outer sleeve 940. The inner diameter of outer sleeve 940 may be greater than the outer diameter of translating screw 950. The inner diameter of translating screw 950 may be greater than the outer diameter, or width, of shaft 966. Outer tube 910, outer sleeve 920, inner sleeve 930, outer sleeve 940, translating screw 950, shaft 960, and shaft 966 may be coaxially aligned and/or substantially coaxially aligned, but in various embodiments coaxial alignment is not present. One end of shaft 960 may bear a handle 970 which may be used for rotating the shaft 960.

Lifting device 900 may further comprise a planetary gear system 980. The planetary gear system 980 in various embodiments as shown includes a ring gear 981, one or more planet gears 982, and a sun gear 983. The system 980 may include one, two, three, four, five, six, seven, eight, or more planet gears 982. Each of the gears 981, 982, 983 includes a plurality of teeth. For example, the ring gear 981 includes teeth 32, each planet gear 982 includes teeth 34, and sun gear 983 includes teeth 36. The teeth 32, 34, and 36 are sized and shaped to mesh together such that the various gears 981, 982, 983 engage each other. For example, the ring gear 981 and the sun gear 983 may each engage the planet gears 982*a*, 982*b*, 982*c*.

The planetary gear system 980 may include a carrier 984 comprising a first plate 985*a* and a second plate 985*b*. Planet gears 982*a*, 982*b*, 982*c* may be rotatably coupled to carrier 984—e.g., supported between first plate 985*a* and second plate 985*b*. Carrier 984 may further comprise a capped flange 986. Capped flange may comprise a splined aperture 22 configured to receive shaft 960. Splined aperture 22 may interlock with splines 962 disposed on shaft 960. In this manner, torsional forces may be transmitted from shaft 960 into carrier 984 via capped flange 986.

In various embodiments, the ring gear 981 may be stationary. For example, ring gear 981 may be fixed to the inner diameter surface of outer tube 910, such as via a splined connection, a threaded connection, a friction fit, a snap fit, a weld, or the like. In these embodiments, the input shaft may be coupled to the carrier 984, and input loads (e.g., torque) on the input shaft 960 may be transmitted through the carrier 984 to the planet gears 982*a*, 982*b*, 982*c*. Thus, the carrier 984 may drive the system 980.

First plate 985*a* and second plate 985*b* may comprise a first plurality of holes aligned to receive a plurality of bolts, such as bolt 42*a*, bolt 42*b*, and bolt 42*c*, for example. Capped flange 986 may similarly comprise a plurality of holes aligned to receive the plurality of bolts 42*a*, 42*b*, 42*c*. In various embodiments, bolt 42*a*, bolt 42*b*, and bolt 42*c* hold capped flange 986, first plate 985*a*, and a second plate 985*b* together. First plate 985*a* and second plate 985*b* may comprise a second plurality of holes aligned to receive shafts associated with planet gears 982*a*, 982*b*, 982*c*. In this manner, bolts 42*a*, 42*b*, 42*c* may each extend between adjacent planet gears 982*a*, 982*b*, 982*c*.

Outer sleeve 920 may be drivably coupled to shaft 960. In various embodiments, bolts 42 may extend into holes 44 disposed in flange 924 of outer sleeve 920. Input loads (e.g., torque) may be transmitted from shaft 960, through carrier 984 and bolts 42, into outer sleeve 920. In this manner, outer sleeve 920 may rotate at a 1:1 ratio with shaft 960.

The outer tube 910 may comprise a retaining member 912. Retaining member 912 may be coupled to outer tube 910, e.g., via a threaded connection, snap fit, friction fit, fasteners, and/or a metal joining process, such as welding, brazing, etc. Retaining member 912 may comprise a cap structure coupled to the upper end of outer tube 910. Retaining member 912 may comprise a flange extending radially inward from outer tube 910. Shaft 960 may extend through retaining member 912. Lifting device 900 may further comprise a bearing 908 supporting, at least in part, shaft 960. Bearing 908 may be disposed between retaining member 912 and capped flange 986. Shaft 960 may extend through bearing 908.

Lifting device 900 may further comprise a spring 906. Spring 906 may be a coil spring, leaf spring, Belleville spring, or other suitable spring for exerting a bias against sun gear 983. Spring 906 may be operatively coupled to outer sleeve 920 and sun gear 983, via shaft 966, to assist movement of outer sleeve 920 and sun gear 983 between first and second positions, as described herein with further detail. In this regard, outer sleeve 920 may be slidable in the outer tube 910 between the first position and the second position. Outer sleeve 920 may translate along centerline axis 992 between the first position and the second position. Spring 906 may be compressed between capped flange 986 and shaft 960, in accordance with various embodiments. Spring 906 may be compressed between capped flange 986 and sun gear 983, in accordance with various embodiments. Spring 906 may bias shaft 960, shaft 966, sun gear 983, and outer sleeve 920 to translate together with respect to outer tube 910 between the first position (see FIG. 21B) and the second position (see FIG. 21D). Outer sleeve 920 may translate with respect to, and about, bolts 42 between the first position and the second position.

Figure 21A:
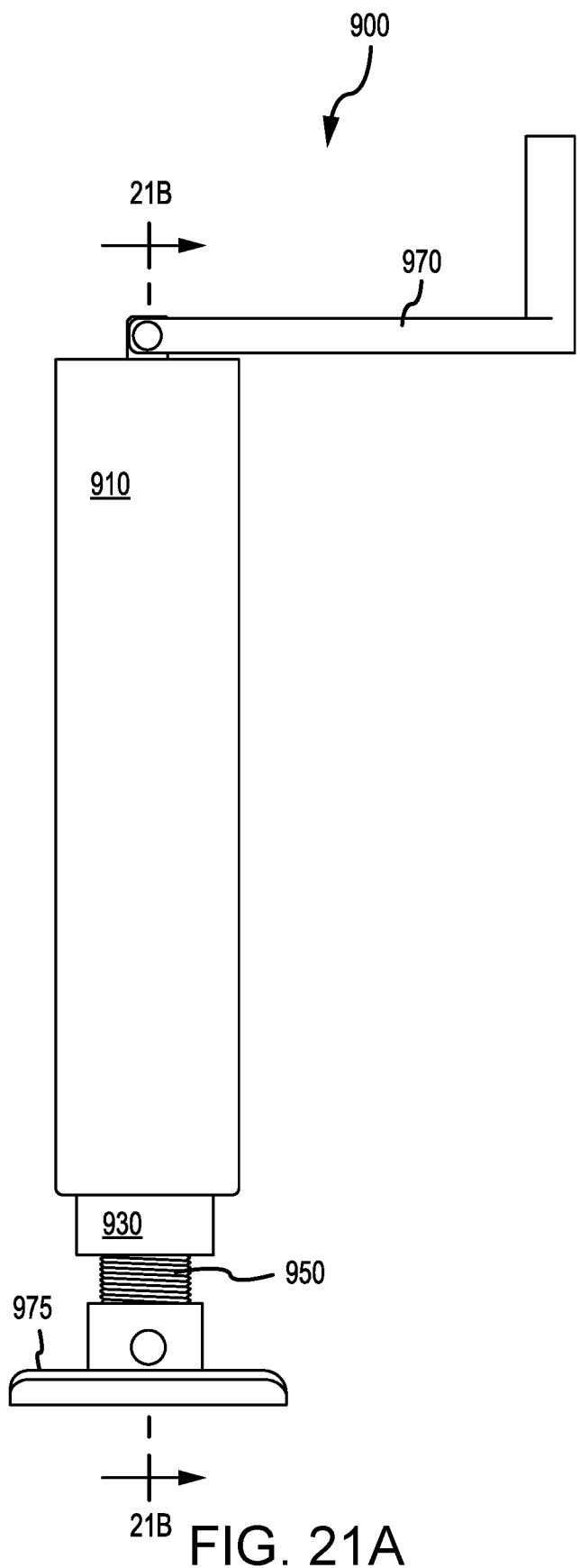
FIG. 21A and FIG. 21B illustrate a side view and a section view, respectively, of the lifting device of FIG. 20, with the lifting device in a retracted state, and an outer sleeve in a first position and a sun gear in a first position, in accordance with various embodiments.
Figure 21B:
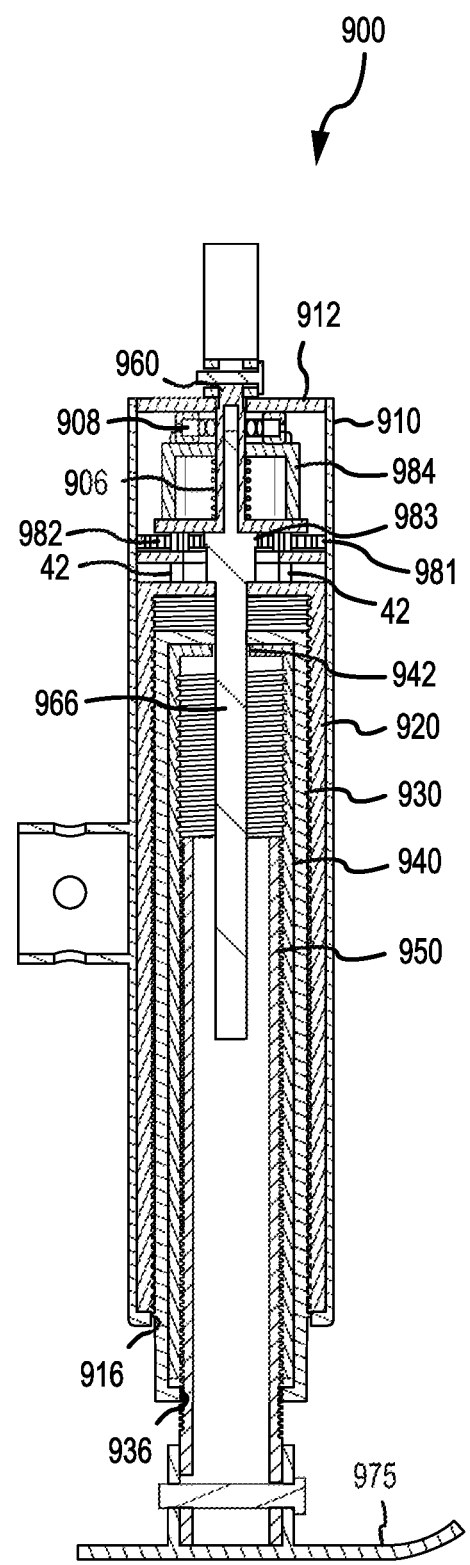

With combined reference to FIG. 20, FIG. 21A, and FIG. 21B, rotation of shaft 960 may drive rotation of carrier 984 (e.g., via splined aperture 22), wherein, in response, the carrier 984 drives rotation of bolts 42a, 42b, 42c, wherein, in response, the bolts 42a, 42b, 42c drive rotation of outer sleeve 920. In various embodiments, outer sleeve 920 is threadedly coupled to inner sleeve 930. Thus, rotation of the outer sleeve 920 causes the inner sleeve 930 to translate with respect to outer tube 910. Stated differently, low speed assembly 904 translates rotational motion of outer sleeve 920 to linear motion of inner sleeve 930. Low speed assembly 904 may be driven by shaft 960 regardless of the position of outer sleeve 920 and/or sun gear 983, in accordance with various embodiments.

Furthermore, with outer sleeve 920 in the first position (see FIG. 21B) with respect to outer tube 910, spring 906 biases sun gear 983 in meshing relation with planet gears 982. In this regard, outer sleeve 940 may be drivably coupled to shaft 960 via planetary gear system 980. Rotation of shaft 960 may drive rotation of carrier 984 (e.g., via splined aperture 22), wherein, in response, the carrier 984 drives rotation of planet gears 982a, 982b, 982c, wherein, in response, the planet gears 982a, 982b, 982c drive rotation of shaft 966, wherein, in response, shaft 966 drives rotation of outer sleeve 940. In various embodiments, outer sleeve 940 is threadedly coupled to translating screw 950. Thus, rotation of the outer sleeve 940 causes the translating screw 950 to translate with respect to outer tube 910. Stated differently, high speed assembly 902 translates rotational motion of outer sleeve 940 to linear motion of translating screw 950.

In various embodiments, rotation of shaft 960 may drive rotation of shaft 966 at a 1:n ratio, wherein n is greater than 1. In various embodiments, n is equal to the number of rotations of shaft 966 per rotation of shaft 960. Planetary gear system 980 may be geared to any suitable ratio which causes shaft 966 to rotate faster than shaft 960, thus causing outer sleeve 940 to rotate faster than outer sleeve 920.

In various embodiments, with outer sleeve 920 in the first position (see FIG. 21B) with respect to outer tube 910 and sun gear 983 in meshing relation with planet gears 982, rotation of shaft 960 in a first rotational direction, e.g., via handle 970, may cause outer sleeve 940 to rotate with respect outer tube 910 and translating screw 950, which in turn causes translating screw 950 to extend from outer sleeve 940. Conversely, rotation of shaft 960 in a second rotational direction (opposite the first rotational direction) may cause outer sleeve 940 to rotate with respect outer tube 910 and translating screw 950, which in turn causes translating screw 950 to retract into outer sleeve 940. In the first position, spring 906 may bias sun gear 983 to engage with planet gears 982. Thus, with the sun gear 983 in the first position, both the inner sleeve 930 and the translating screw 950 are driven to translate with respect to outer tube 910 in response to rotation of shaft 960.

However, in operation and with outer sleeve 920 and sun gear 983 in second positions (see FIG. 21D) with respect to outer tube 910 and/or planet gears 982, the sun gear 983 (and thus the output shaft 966) is disengaged from planet gears 982 (i.e., rotation of shaft 960 does not drive rotation of output shaft 966 and outer sleeve 940 in the disengaged position). In this regard, with sun gear 983 in the second position, rotation of shaft 960 in the first rotational direction or the second rotational direction may cause only outer sleeve 920 (and not outer sleeve 940) to rotate with respect to outer tube 910, thereby driving only the inner sleeve 930 to translate. Stated differently, the high speed assembly 902 (i.e., the outer sleeve 940 and translating screw 950) may be disengaged from operation in response to the outer sleeve 920 and/or sun gear 983 moving to the second position. In this manner, in response to rotation of shaft 960 in the first direction, both the high speed assembly 902 and the low speed assembly 904 (i.e., the outer sleeve 920 and inner sleeve 930) are driven to increase the overall length of lifting device 900 but, after reacting force from the ground through, for example, foot 975, rotation of shaft 960 is only imparted to low speed assembly 904 and not high speed assembly 902. With momentary reference to FIG. 21C and FIG. 21D, as the overall length of lifting device 900 is increased, the foot 975 of the lifting device 900 may contact a ground surface 402, thereby imparting a force 404 from the ground surface 402 into the outer sleeve 920 which causes the outer sleeve 920 to move with respect to outer tube 910 against the bias of spring 906 from the first position. Said force may be transmitted through outer sleeve 920 into shaft 966, thereby pushing shaft 966 upwards against the bias of spring 906 and removing sun gear 983 from meshing relation with planet gears 982. In this manner, sun gear 983 may move from the first position (i.e., engaged with planet gears 982) to the second position (i.e., disengaged from planet gears 982) thereby decoupling outer sleeve 940 from torsional forces imparted by shaft 960. In this regard, before the lifting device 900 has contacted a ground surface, the overall length of the lifting device 900 is quickly increased to reduce the overall number of rotations of shaft 960 needed to cause lifting device 900 to reach the ground. In response to contacting the ground, the high speed assembly 902 is decoupled from the shaft 960 to take advantage of the mechanical advantage of the low speed assembly 904. In this manner, time to operate is reduced relative to conventional designed and increased mechanical advantage is selectively activated.

In various embodiments, inner sleeve 930 comprises threads 932. In various embodiments, translating screw 950 comprises threads 952. The thread pitch of threads 932 may be equal to, less than, or greater than the thread pitch of threads 952. In various embodiments, the thread pitch of threads 932 is equal to the thread pitch of threads 952. In response to shaft 966 rotating faster than shaft 960, translating screw 950 may translate faster in linear distance than inner sleeve 930, even though threads 952 and threads 932 may comprise the same thread pitch.

With reference to FIG. 20 and FIG. 4B, inner sleeve 930 may be keyed to outer tube 910 to prevent rotation of inner sleeve 930 with respect to outer tube 910. For example, inner sleeve 930 may comprise one or more axially extending grooves 934 (see FIG. 20) disposed in the outer diameter surface thereof and outer tube 910 may comprise corresponding protrusion(s) 916 extending radially inwards from an inner diameter surface thereof that extends into groove(s) 934.

In various embodiments, translating screw 950 may be keyed to inner sleeve 930 to prevent rotation of translating screw 950 with respect to inner sleeve 930 and outer tube 910. For example, translating screw 950 may comprise one or more axially extending grooves 954 (see FIG. 20) disposed in the outer diameter surface thereof and inner sleeve 930 may comprise corresponding protrusion(s) 936 extending radially inwards from an inner diameter surface thereof that extends into groove(s) 954.

Benefits and other advantages have been described herein with regard to specific embodiments. Furthermore, the connecting lines shown in the various figures contained herein are intended to represent example functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A linear jack, comprising:
   a first outer sleeve;
   an inner sleeve disposed at least partially within the first outer sleeve;
   a second outer sleeve disposed at least partially within the inner sleeve;
   a translating screw disposed at least partially within the second outer sleeve;
   an outer tube comprising a centerline axis, wherein the first outer sleeve is disposed at least partially within the outer tube;
   a shaft coupled to the second outer sleeve;
   a gear coupled to the shaft; and
   a spring operatively coupled to the first outer sleeve;
   wherein the inner sleeve is configured to translate with respect to the first outer sleeve in response to rotation of the first outer sleeve, and the translating screw is configured to translate with respect to the second outer sleeve in response to rotation of the second outer sleeve;
   the first outer sleeve is threadedly coupled to the inner sleeve, the second outer sleeve is threadedly coupled to the translating screw, a thread pitch of the inner sleeve is greater than a thread pitch of the translating screw, and the first outer sleeve is slidable in the outer tube between a first position and a second position, wherein:
      in the first position, the spring biases the first outer sleeve to engage the gear whereby turning the shaft a first rotational direction extends the inner sleeve from the first outer sleeve, and turning the shaft a second rotational direction retracts the inner sleeve into the first outer sleeve; and
      in the second position, the first outer sleeve is moved against a bias of the spring and disengaged from the gear whereby turning the shaft the first rotational direction extends the translating screw from the second outer sleeve, and turning the shaft the second rotational direction retracts the translating screw into the second outer sleeve.

2. The linear jack of claim 1, wherein turning the shaft the first rotational direction extends the translating screw from the second outer sleeve, and turning the shaft the second rotational direction retracts the translating screw into the second outer sleeve, regardless of the first outer sleeve being in the first position or the second position.

3. The linear jack of claim 1, wherein the gear is disposed within the first outer sleeve.

4. The linear jack of claim 1, wherein the spring is disposed within the outer tube.

5. The linear jack of claim 1, wherein the second outer sleeve rotates with the shaft.

6. The linear jack of claim 1, wherein the first outer sleeve, the inner sleeve, the second outer sleeve, and the translating screw are in coaxial alignment.

7. The linear jack of claim 1, further comprising a foot coupled to an end of the translating screw.

8. A linear jack, comprising:
- a first outer sleeve disposed at least partially around an inner sleeve, wherein the first outer sleeve is threadedly coupled to the inner sleeve;
- an outer tube having a centerline axis, the outer tube coaxial to the first outer sleeve and the inner sleeve, wherein the first outer sleeve translates along the centerline axis with respect to the outer tube between a first position and a second position; and
- a spring operatively coupled to the first outer sleeve, wherein the spring is configured to bias the first outer sleeve towards the first position;
- wherein the first outer sleeve is linearly translatable between the first position wherein the first outer sleeve is drivably coupled with a shaft and the second position wherein the first outer sleeve is disengaged from the shaft;
- the shaft is coaxially aligned with the first outer sleeve and the inner sleeve;
- the first outer sleeve is configured to move to the second position against a bias of the spring; and
- the first outer sleeve comprises a flange disposed at an upper end thereof, and the shaft is configured to extend through the flange.

9. The linear jack of claim 8, further comprising:
- a gear configured to rotate with the shaft; and
- a plurality of teeth disposed on the flange of the first outer sleeve, wherein the plurality of teeth are configured to be in meshing relation with the gear in response to the first outer sleeve moving to the first position.

10. A method of manufacturing a linear jack, comprising:
- disposing an inner sleeve at least partially within a first outer sleeve, wherein the first outer sleeve is threadedly coupled to the inner sleeve;
- disposing a translating screw at least partially within a second outer sleeve, wherein the second outer sleeve is threadedly coupled to the translating screw;
- disposing the second outer sleeve at least partially within the inner sleeve;
- disposing a spring within an outer tube;
- disposing the first outer sleeve at least partially within the outer tube and in contact with the spring; and
- disposing a shaft to extend through at least the outer tube, the first outer sleeve, the inner sleeve, and the second outer sleeve;
- wherein a thread pitch of the inner sleeve is greater than a thread pitch of the translating screw.

* * * * *